(12) United States Patent
Sugawara et al.

(10) Patent No.: US 9,032,118 B2
(45) Date of Patent: May 12, 2015

(54) ADMINISTRATION DEVICE, INFORMATION PROCESSING DEVICE, AND DATA TRANSFER METHOD

(71) Applicant: Fujitsu Limited, Kawasaki-shi, Kanagawa (JP)

(72) Inventors: Akira Sugawara, Kawasaki (JP); Tsuyoshi Hashimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/086,063

(22) Filed: Nov. 21, 2013

(65) Prior Publication Data
US 2014/0082232 A1    Mar. 20, 2014

Related U.S. Application Data

(63) Continuation of application No. PCT/JP2011/061788, filed on May 23, 2011.

(51) Int. Cl.
| | |
|---|---|
| *G06F 13/36* | (2006.01) |
| *G06F 12/00* | (2006.01) |
| *G06F 13/10* | (2006.01) |

(52) U.S. Cl.
CPC ............... *G06F 13/36* (2013.01); *G06F 12/00* (2013.01); *G06F 13/10* (2013.01)

(58) Field of Classification Search
CPC ................................ G04L 41/12; G04L 41/00
See application file for complete search history.

(56) References Cited

U.S. PATENT DOCUMENTS

| | | |
|---|---|---|
| 4,893,303 A | 1/1990 | Nakamura |
| 2003/0037224 A1* | 2/2003 | Oehler et al. ................... 712/29 |
| 2004/0122973 A1 | 6/2004 | Keck et al. |

(Continued)

FOREIGN PATENT DOCUMENTS

| | | |
|---|---|---|
| JP | H01-126760 | 5/1989 |
| JP | H01-187666 | 7/1989 |
| JP | H09-506728 | 6/1997 |

(Continued)

OTHER PUBLICATIONS

International Search Report, mailed in connection with PCT/JP2011/061788 and mailed Aug. 23, 2011.

(Continued)

*Primary Examiner* — Hyun Nam
(74) *Attorney, Agent, or Firm* — Fujitsu Patent Center

(57) ABSTRACT

An administration device includes a reception unit, a specifying unit, and a transmission unit. The reception unit receives a transfer request for requesting data transfer to an input-output device from an information processing device. In response to the transfer request, the specifying unit when determining that the communication path to the input-output device is already selected, specifies an information processing device or an input-output processing device, and when determining that the communication path is not selected, selects a communication path to the input-output device according to the first communication state stored in the first storage unit and the second communication state stored in the second storage unit, and specifies an information processing device or an input-output processing device. The transmission unit transmits, to the information processing device, an identifier for identifying the information processing device or the input-output device specified by the specifying unit.

7 Claims, 19 Drawing Sheets

(56) References Cited

U.S. PATENT DOCUMENTS

| | | | |
|---|---|---|---|
| 2007/0016822 A1* | 1/2007 | Rao et al. | 714/4 |
| 2010/0238944 A1* | 9/2010 | Ajima et al. | 370/401 |

FOREIGN PATENT DOCUMENTS

| | | |
|---|---|---|
| JP | 10-198618 A | 7/1998 |
| JP | 2001-285341 | 10/2001 |
| JP | 2004-118855 | 4/2004 |
| JP | 2004-274702 | 9/2004 |
| JP | 2005-500622 A | 1/2005 |
| JP | 2006-511878 | 4/2006 |
| JP | 2007-526540 | 9/2007 |
| JP | 2009-020797 | 1/2009 |
| JP | 2010-141443 | 6/2010 |
| JP | 2010-218364 | 9/2010 |
| WO | 95-16964 | 6/1995 |
| WO | 03/017126 A1 | 2/2003 |
| WO | 2005-003893 | 1/2005 |

OTHER PUBLICATIONS

Japanese Office Action mailed Sep. 2, 2014 for corresponding Japanese Patent Application No. 2013-516099, with English Translation, 12 pages.

* cited by examiner

FIG.5

| LINK ID | NODE a | NODE b | COMMUNICATION STATE | |
|---|---|---|---|---|
| xxx1 | COMPUTING NODE 2 | COMPUTING NODE 3 | Normal | ~(A) |
| xxx2 | COMPUTING NODE 3 | COMPUTING NODE 4 | Normal | |
| xxx3 | COMPUTING NODE 4 | COMPUTING NODE 5 | Normal | |
| xxx4 | COMPUTING NODE 2 | COMPUTING NODE 6 | Normal | |
| xxx5 | COMPUTING NODE 6 | COMPUTING NODE 7 | Normal | |
| xxx6 | COMPUTING NODE 10 | IO NODE 14 | Normal | |

FIG.6

| LINK ID | IO NODE | IO DEVICE | COMMUNICATION STATE | OPERATION STATE | |
|---|---|---|---|---|---|
| 001 | IO NODE 14 | IO DEVICE 20 | Normal | Active | ~(A) |
| 002 | IO NODE 15 | IO DEVICE 20 | Normal | Stanby | |
| 003 | IO NODE 15 | IO DEVICE 21 | Normal | Active | |
| 004 | IO NODE 16 | IO DEVICE 22 | Normal | Stanby | |
| 005 | IO NODE 17 | IO DEVICE 21 | Normal | Stanby | |
| 006 | IO NODE 17 | IO DEVICE 22 | Normal | Active | |

FIG.7

| DATA ID | TRANSFER ORIGIN ID | FINAL TRANSFER DESTINATION ID |
|---|---|---|
| xxx1 | COMPUTING NODE 2 | IO DEVICE 20 |
| xxx2 | COMPUTING NODE 7 | IO DEVICE 21 |

FIG.8

| DATA ID | COMMUNICATION PATH ID | TRANSFER SOURCE ID | TRANSFER DESTINATION ID | TRANSFER ORIGIN ID | FINAL TRANSFER DESTINATION ID |
|---|---|---|---|---|---|
| xxx2 | xxx2.01 | COMPUTING NODE 7 | COMPUTING NODE 11 | COMPUTING NODE 7 | IO DEVICE 21 |
| xxx2 | xxx2.02 | COMPUTING NODE 11 | IO NODE 15 | COMPUTING NODE 7 | IO DEVICE 21 |
| xxx2 | xxx2.03 | IO NODE 15 | IO DEVICE 21 | COMPUTING NODE 7 | IO DEVICE 21 |

FIG.10

| LINK ID | NODE a | NODE b | COMMUNICATION STATE | |
|---|---|---|---|---|
| xxx1 | COMPUTING NODE 2 | COMPUTING NODE 3 | Normal | |
| xxx2 | COMPUTING NODE 3 | COMPUTING NODE 4 | Normal | |
| xxx3 | COMPUTING NODE 4 | COMPUTING NODE 5 | Normal | |
| xxx4 | COMPUTING NODE 2 | COMPUTING NODE 6 | Normal | |
| xxx5 | COMPUTING NODE 6 | COMPUTING NODE 7 | Normal | |
| xxx6 | COMPUTING NODE 10 | IO NODE 14 | Normal | |
| xxx7 | COMPUTING NODE 11 | IO NODE 15 | Falll | ~(A) |

FIG.12

| LINK ID | IO NODE | IO DEVICE | COMMUNICATION STATE | OPERATION STATE | |
|---|---|---|---|---|---|
| 001 | IO NODE 14 | IO DEVICE 20 | Normal | Active | |
| 002 | IO NODE 15 | IO DEVICE 20 | Normal | Stanby | |
| 003 | IO NODE 15 | IO DEVICE 21 | Falll | Falll | ~(A) |
| 004 | IO NODE 16 | IO DEVICE 22 | Normal | Stanby | |
| 005 | IO NODE 17 | IO DEVICE 21 | Normal | Stanby | |
| 006 | IO NODE 17 | IO DEVICE 22 | Normal | Active | |

FIG.13A

| DATA ID | COMMUNI-CATION PATH ID | TRANSFER SOURCE ID | TRANSFER DESTINATION ID | TRANSFER ORIGIN ID | FINAL TRANSFER DESTINATION ID |
|---|---|---|---|---|---|
| xxx2 | xxx2.01 | COMPUTING NODE 7 | COMPUTING NODE 11 | COMPUTING NODE 7 | IO DEVICE 21 |
| xxx2 | xxx2.02 | COMPUTING NODE 11 | COMPUTING NODE 12 | COMPUTING NODE 7 | IO DEVICE 21 |
| xxx2 | xxx2.03 | COMPUTING NODE 12 | IO NODE 16 | COMPUTING NODE 7 | IO DEVICE 21 |
| xxx2 | xxx2.04 | IO NODE 16 | IO NODE 15 | COMPUTING NODE 7 | IO DEVICE 21 |
| xxx2 | xxx2.05 | IO NODE 15 | IO DEVICE 21 | COMPUTING NODE 7 | IO DEVICE 21 |

FIG.13B

| DATA ID | COMMUNI-CATION PATH ID | TRANSFER SOURCE ID | TRANSFER DESTINATION ID | TRANSFER ORIGIN ID | FINAL TRANSFER DESTINATION ID |
|---|---|---|---|---|---|
| xxx2 | xxx2.01 | COMPUTING NODE 7 | COMPUTING NODE 11 | COMPUTING NODE 7 | IO DEVICE 21 |
| xxx2 | xxx2.02 | COMPUTING NODE 11 | COMPUTING NODE 12 | COMPUTING NODE 7 | IO DEVICE 21 |
| xxx2 | xxx2.03 | COMPUTING NODE 12 | COMPUTING NODE 13 | COMPUTING NODE 7 | IO DEVICE 21 |
| xxx2 | xxx2.04 | COMPUTING NODE 13 | IO NODE 17 | COMPUTING NODE 7 | IO DEVICE 21 |
| xxx2 | xxx2.05 | IO NODE 17 | IO DEVICE 21 | COMPUTING NODE 7 | IO DEVICE 21 |

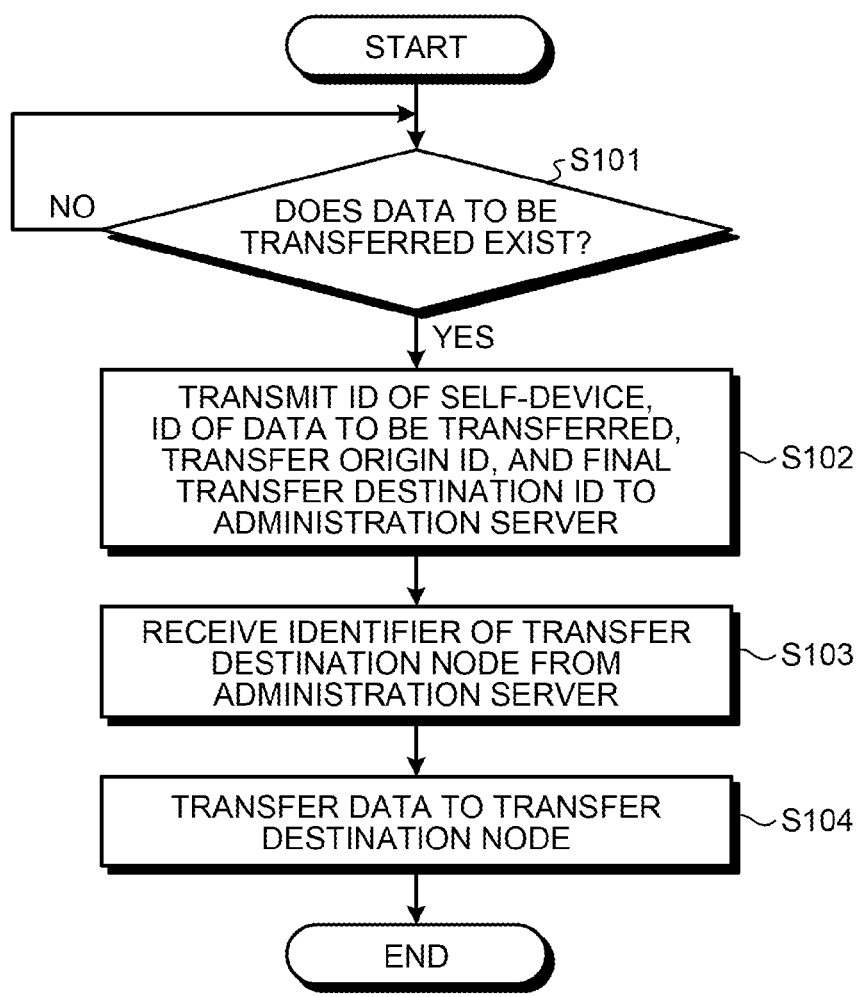

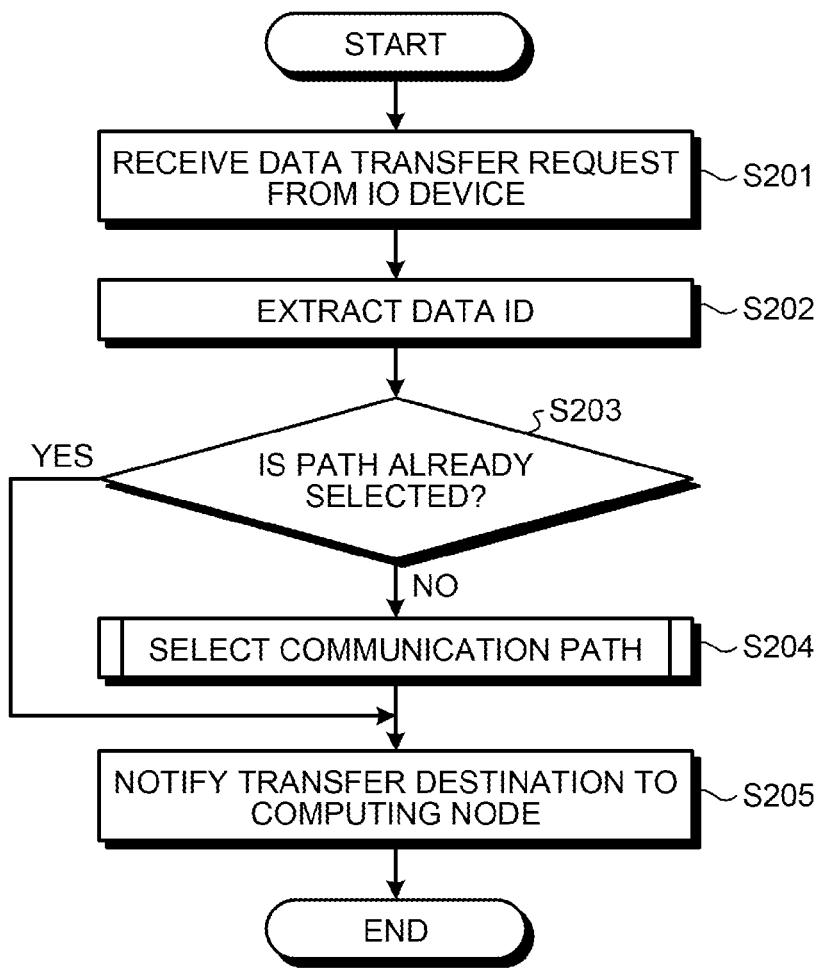

ADMINISTRATION DEVICE, INFORMATION PROCESSING DEVICE, AND DATA TRANSFER METHOD

CROSS-REFERENCE TO RELATED APPLICATION

This application is a continuation application of International Application PCT/JP2011/061788, filed on May 23, 2011, the entire contents of which are incorporated herein by reference.

FIELD

The present invention relates to administration devices, information processing devices, and data transfer methods.

BACKGROUND

Conventionally, computer systems with a plurality of nodes have a cluster configuration in which nodes are connected with each other by interconnects. In the cluster configuration, the nodes execute distributed processes in parallel, which improves performance of the computer system. In addition, even if some of the nodes causes a failure and stops its process, the normal nodes continue to execute the processes, which improves availability of the computer system.

A configuration example of a computer system having a cluster configuration will be described with reference to FIG. 21. FIG. 21 is a diagram illustrating a configuration example of a computer system having a cluster configuration. As illustrated in FIG. 21, a computer system 900 includes computing nodes 901 to 912, IO (input-output) nodes 913 to 916, and IO devices 917 and 918. The computing nodes 901 to 912 execute various arithmetic operations and application processes. The IO nodes 913 to 916 control input into and output from the IO devices. The IO devices 917 and 918 are storage devices storing data and applications, for example.

As illustrated in FIG. 21, connections are made by interconnects between the computing nodes, between the IO nodes, and between the computing nodes and the IO nodes. In the example of FIG. 21, the IO node 913 is connected to the IO device 917, the IO node 914 is connected to the IO device 918, the IO node 915 is connected to the IO device 918, and the IO node 916 is connected to the IO device 917. The connection illustrated by a dotted line between the IO node 914 and the IO device 918 is a standby connection that is used if an abnormality occurs at the connection illustrated by a solid line between the IO node 915 and the IO device 918. Similarly, the connection illustrated by a dotted line between the IO node 916 and the IO device 917 is a standby connection that is used if an abnormality occurs at the connection by a solid line between the IO node 913 and the IO device 917.

In the foregoing computer system, in a case of transferring data to an IO device, a computing node first transfers the data to an IO node connected to the IO device as a destination by dimension-order routing. For example, the data to be transferred by dimension-order routing is first transferred from a source node along an X axis to a node with an X coordinate corresponding to the X coordinate of a destination node. Then, the transfer direction of the data is converted onto a Y axis, and the data is transferred to the destination node along the Y axis.

For example, in a case where the computing node 901 illustrated in FIG. 21 transfers data to the IO device 918, the computing node 901 first transfers the data to the IO node 915 connected to the IO device 918 through the computing nodes 902, 903, 907, and 911. The communication path selected by dimension-order routing is generally preset to the computing nodes 901 to 912 and the IO nodes 913 to 916.

Patent Literature 1: Japanese Laid-Open Patent Publication No. 2010-218364

However, the foregoing related technique has a problem that availability of data transfer is not high.

For example, if there occurs an abnormality at a node existing in a path selected by dimension-order routing or connection (interconnect) between the nodes, a computing node fails to transfer data. Referring to FIG. 21, descriptions will be given as to a case where the computing node 903 and the computing node 907 are disconnected. The computing node 901 is connected to the IO node 915 on paths bypassing the computing node 903, but the computing node 901 attempts to transfer data through the computing node 903 along a path selected by dimension-order routing. As a result, the computing node 901 fails to transfer the data to the IO node 915.

In the related technique, if a failure occurs at an active IO node connected to an IO device, a computing node may fail to transfer data. Referring to FIG. 21, descriptions will be given as to a case where, when the computing node 906 transfers data to the IO device 918, an abnormality occurs at the active IO node 915 and the IO node 914 is switched from standby state to active state.

Even if the active node is switched from the IO node 915 to the IO node 914, the computing node 906 attempts to transfer data to the computing node 907, the computing node 911, and the IO node 915 along the path selected by dimension-order routing. In this case, when the IO node 915 fails to transfer data to the IO node 914, the computing node 906 fails to transfer data to the IO device 918.

Meanwhile, when the IO node 915 can transfer data to the IO node 914, the computing node 906 can transfer data to the IO device 918. However, data is transferred to the IO node 914 through more nodes than those in the shortest path from the computing node 906 to the IO node 914. For example, when data is to be transferred from the computing node 906 to the IO node 914, the path with the smallest number of nodes includes the computing node 910. However, the computing node 906 follows the preset path and thus fails to select the shortest path. Accordingly, when data is transferred, transfer of the data by the computing node may be delayed.

SUMMARY

To solve the above problem and attain the object, an administration device disclosed in this application, according to an aspect, includes: a first storage unit; a second storage unit; a reception unit; a specifying unit; and a transmission unit. The first storage unit stores first communication state between interconnected information processing devices or between interconnected information processing device and input-output device. The second storage unit stores second communication state between an input-output device into or from which data is input or output and an input-output processing device that inputs or outputs data into or from the input-output device, in association with identification information of the input-output processing device. The reception unit receives a transfer request for requesting data transfer to the input-output device from an information processing device. The specifying unit, in response to the transfer request received by the reception unit, determines whether a communication path to the input-output device is already selected, when determining that the communication path to the input-output device is already selected, specifies an information processing device or an input-output processing device as a transfer destination from the selected communication path, and when determining that the communication path is not selected, selects a communication path to the input-output device according to the first communication state stored in the first storage unit and the second communication state stored in the second storage unit, and specifies an information processing device or an input-output processing device as a transfer destination according to the selected communication path. The transmission unit transmits, to the information processing device having issued the transfer request, an identifier for identifying the information processing device or the input-output device specified by the specifying unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating one example of a link management table.

FIG. 6 is a diagram illustrating one example of an IO node management table.

FIG. 7 is a diagram illustrating one example of a transfer data management table.

FIG. 8 is a diagram illustrating one example of a communication path management table.

FIG. 10 is a diagram illustrating one example of a link management table updated by an update unit.

FIG. 12 is a diagram illustrating one example of an IO node management table updated by a generation unit.

FIG. 13A is a diagram illustrating one example of a communication path management table.

FIG. 13B is a diagram illustrating one example of a communication path management table.

FIG. 14 is a flowchart of a procedure for a process of data transfer by a computing node to an IO device.

FIG. 15 is a flowchart of a procedure for a process by the administration server.

DESCRIPTION OF EMBODIMENTS

Embodiments of a management device, an information processing device, an information processing system, a data transfer method, a path selection program, and a transfer request program disclosed in the subject application will be described below in detail with reference to the drawings. However, the present invention is not limited to the examples. In addition, the examples can be combined as appropriate without causing inconsistency in the contents of processes.

[First Embodiment]

Here, descriptions will be sequentially given as to a configuration of a computer system according to a first embodiment, a configuration of a computing node, a configuration of an IO (input-output) node, a configuration of an administration server, procedures for processes by the computing node, procedures for processes by the administration server, and advantages of the first embodiment.

[Configuration of a Computer System According to First Embodiment]

Figure 1:
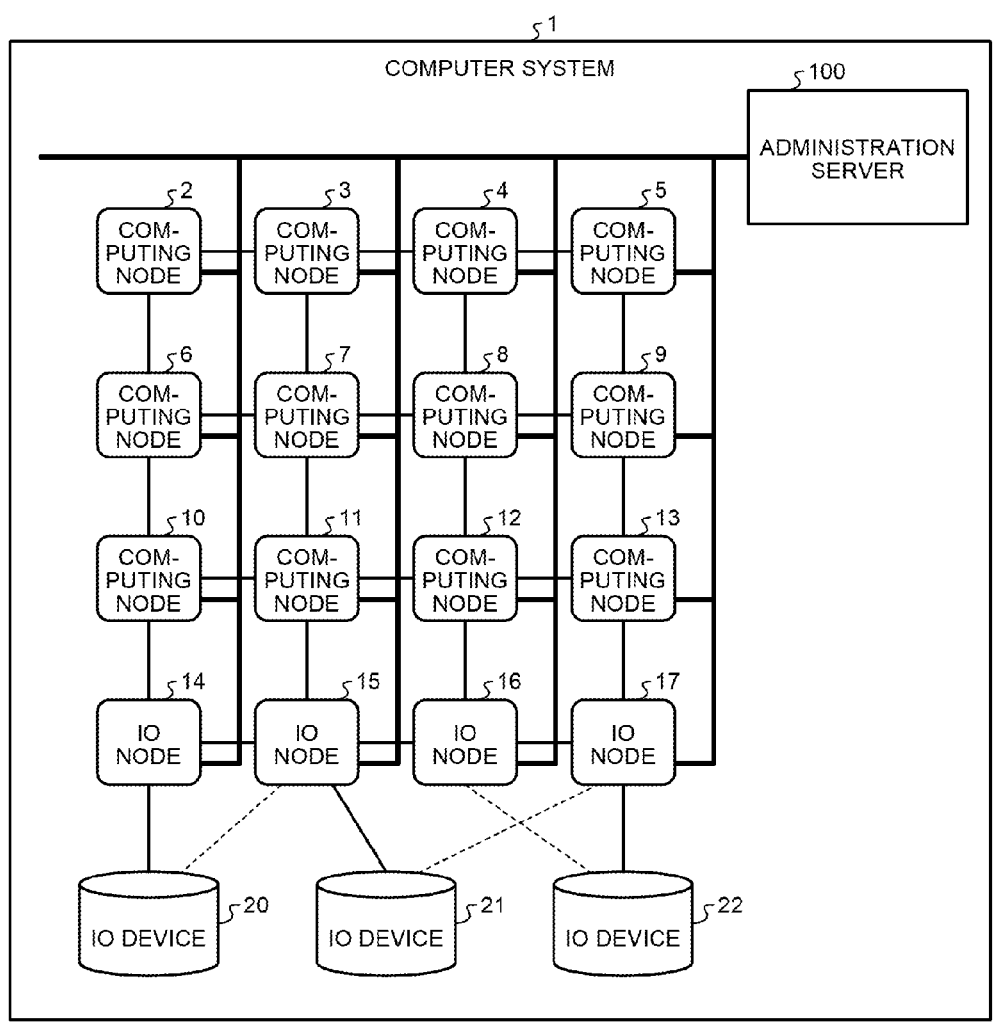
FIG. 1 is a diagram illustrating a configuration example of a computer system.

A computer system 1 illustrated in FIG. 1 has computing nodes 2 to 13, IO nodes 14 to 17, IO devices 20 to 22, and an administration server 100. In this arrangement, the number of computing nodes, the number of IO nodes, and the number of IO devices included in the computer system 1 are mere examples and are not limited to the foregoing ones but can be arbitrarily changed. The computing nodes 2 to 13 and the IO nodes 14 to 17 are examples of information processing devices. The administration server 100 is one example of an administration device.

The administration server 100 and each of the computing node 2 to 13 are connected together via a LAN (local area network), for example. The administration server 100 and each of the IO nodes 14 to 17 are connected together via a LAN, for example.

The adjacent computing nodes, the adjacent computing nodes and IO nodes, and the adjacent IO nodes, are connected together in a mesh form by interconnects, for example. In the example of FIG. 1, the computing node 2 is connected to the computing node 3 and the computing node 6, and the computing node 11 is connected to the computing node 7, the computing node 10, the computing node 12, and the IO node 15. In the following description, the computer system 1 is connected in a mesh form, but the computer system 1 is not limited to this but may be connected in a torus form, for example.

The IO node 14 and the IO device 20 are connected via an IO bus such as a fibre channel. The IO node 15 and the IO devices 20 and 21 are connected via fibre channels. The IO node 16 and the IO device 22 are connected via a fibre channel. The IO node 17 and the IO devices 21 and 22 are connected via fibre channels. In the following description, the IO nodes and the IO devices are connected via fibre channels, but a connection between the IO nodes and the IO devices is not limited to fibre channels. The IO nodes and the IO devices may be connected together via iSCSI, for example.

In the example of FIG. 1, the IO nodes have an active-passive configuration with respect to the IO devices, and connections between the active IO nodes and IO devices are indicated by solid lines, and connections between the standby IO nodes and IO devices are indicated by dotted lines. The active-passive configuration refers to a configuration in which, of a plurality of nodes sharing IO devices, the active nodes occupy the IO devices in the normal operation state.

The plurality of nodes sharing the IO devices is divided into active nodes and standby nodes, and the active nodes and the standby nodes do not use the same IO device at the same time. At the normal operational time, only the active nodes use the IO devices. If a failure has occurred at an active node, the standby node uses the IO device. For example, with respect to the IO device 20, the IO node 14 is an active node and the IO node 15 is a standby node. With respect to the IO device 21, the IO node 15 is an active node and the IO node 17 is a standby node. With respect to the IO device 22, the IO node 17 is an active node and the IO node 16 is a standby node. However, the IO devices and the IO nodes in the computer system are not limited to the active-passive configuration but may have an active-active configuration in which the IO node 14 and the IO node 15 use the IO device 20 at the same time, for example.

The computing nodes 2 to 13 execute various arithmetic operations based on data input from the IO devices 20 to 22 and execute applications input from the IO devices 20 to 22.

The computing nodes monitor the states of communications between the self-device and the connected nodes and the states of communications between the self-device and the connected IO nodes, and notify the monitored communications states to the administration server 100. For example, the computing node 12 monitors the states of communications with the computing node 8, the computing node 11, and the computing node 13 and the state of communications with the IO node 16, and notifies the monitored communications states to the administration server 100.

In a case of transferring data to an IO device, the computing nodes 2 to 13 transmit to the administration server 100 a data transfer request indicative of a request for transferring the data to the IO device. For example, descriptions will be given as to a case where the computing node 7 illustrated in FIG. 1 transfers data to the IO device 21. In this case, the computing node 7 is not adjacent to the IO device 21. Accordingly, when transferring the data to the IO device 21, the data is relayed to another adjacent node. In the following description, the node as a first source of data transfer is designated as appropriate as "transfer origin," and the IO device as a final destination of data transfer as "final transfer destination."

The computing node 7 transmits to the administration server 100 a transfer request including the identifier of the device as a transfer origin, the identifier for identifying the self-device, the identifier for identifying data to be transferred, and the identifier of the IO device 21 as a final transfer destination. The identifier of the device as a transfer origin and the identifier for identifying the self-device transmitted by the computing node 7 as a transfer origin have the identical value.

Subsequently, the computing node 7 is informed by the administration server 100 that the computing node 11 is a destination node to which the data is relayed. Then, the computing node 7 transmits the data to the computing node 11. In this case, the data transmitted by the computing node 7 includes the identifier of the device as a transfer origin, the identifier for identifying the self-device, the identifier for identifying the data to be transferred, and the identifier of the IO device 21 as a final transfer destination.

When receiving data from adjacent computing nodes, the computing nodes 2 to 13 transmit a transfer request to the administration server 100. For example, descriptions will be given as to a case where the computing node 11 illustrated in FIG. 1 receives from the computing node 7 as a transfer origin the data to be transferred to the IO device 21 as a final transfer destination.

The computing node 11 extracts from the received data the identifier of the device as a transfer origin, the identifier for identifying the self-device, the identifier for identifying the data to be transferred, and the identifier of the IO device 21 as a final transfer destination. Then, the computing node 11 transmits to the administration server 100 a transfer request including the identifier of the computing node 7 as a transfer origin, the identifier for identifying the self-device, the identifier for identifying the data to be transferred, and identifier of the IO device 21 as a final transfer destination. The computing node 11 is informed by the administration server 100 that the IO node 15 is a destination node as a data relay node. Then, the computing node 11 transmits to the IO node 15 the data including the identifier of the computing node 7 as a transfer origin, the identifier for identifying the self-device, the identifier for identifying the data to be transferred, and the identifier of the IO device 21 as a final transfer destination.

The IO nodes 14 to 17 control inputs into and outputs from the IO devices 20 to 22. For example, the IO node 15 receives the data transferred from the computing node 11 and outputs the same to the IO device 21. The IO node 15 also outputs data read from the IO device 21 to the computing node 11.

The IO nodes monitor the state of communications between the self-device and the connected IO nodes and the state of communications between the self-device and the connected computing nodes, and notify the monitored communications states to the administration server 100. For example, the IO node 15 monitors the state of communications with the IO node 14 and the IO node 16, the state of communications with the computing node 11, and the state of communications with the IO devices 20 and 21, and notifies the monitored communications states to the administration server 100.

The IO devices 20 to 22 are storage devices such as HDDs (hard disk drives), for example, and store data and applications. In the following description, the IO devices 20 to 22 are storage devices such as HDDs, but the IO devices 20 to 22 are not limited to this but may be various sensors, printers, displays, or the like, for example. In the following description, the computing nodes 2 to 13 and the IO nodes 14 to 17 will be referred to simply as appropriate as nodes 2 to 17.

The administration server 100 stores the notified respective communication state of the computing nodes 2 to 13 and the IO nodes 14 to 17. The administration server 100 also stores the states of communications between a plurality of IO devices storing data and nodes inputting data into or outputting data from the plurality of IO devices.

When receiving from any of the nodes a data transfer request for requesting transfer of data to any of the plurality of IO devices 20 to 22, the administration server 100 executes the following process. Specifically, the administration server 100 selects a communication path to the IO device, based on the respective state of communication between the plurality of nodes and the respective state of communication between the nodes inputting data into or outputting data from the IO devices and the IO devices. The administration server 100 also specifies the computing node or the IO node as a transfer destination, based on the selected communication path. Then, the administration server 100 transmits to the computing node having issued the transfer request the identifier for identifying the specified computing node or IO node.

[Configuration of a Computing Node]

Figure 2:
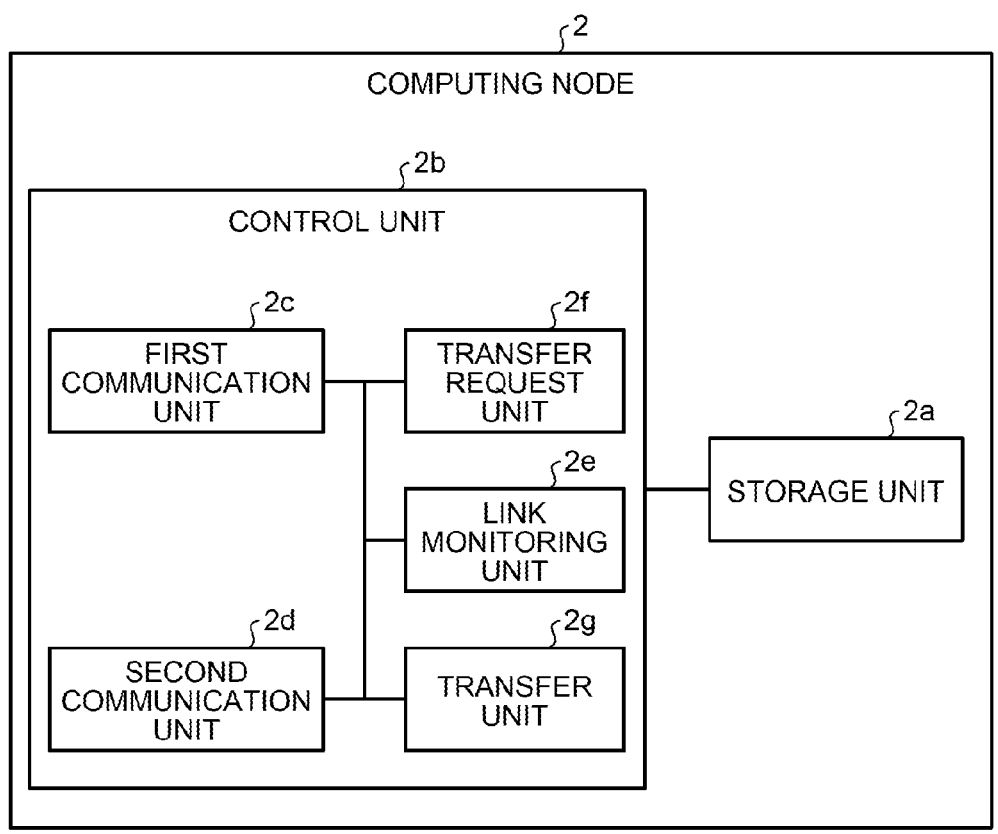
FIG. 2 is a block diagram illustrating a configuration of a computing node.

FIG. 2 is a block diagram illustrating a configuration of a computing node according to the first embodiment. As illustrated in FIG. 2, the computing node 2 has a storage unit 2*a* and a control unit 2*b*. The computing nodes 2 to 13 are the same in configuration, and thus only the configuration of the computing node 2 will be described and descriptions of the configurations of the computing nodes 3 to 13 will be omitted.

The storage unit 2a is a semiconductor memory element or a storage device such as a hard disk, for example, which stores results of various processes executed at the self-device, and data, applications, and the like for various processes executed at the self-device. The storage unit 2a also stores the identifier for identifying the self-device, the identifier for identifying the IO device into or from which data is input or output, and the like.

The control unit 2b includes a first communication unit 2c, a second communication unit 2d, a link monitoring unit 2e, a transfer request unit 2f, and a transfer unit 2g. For example, the control unit 2b is an integrated circuit such as an ASIC (application specific integrated circuit), FPGA (field programmable gate array), CPU (central processing unit), and MPU (micro processing unit), for example. The control unit 2b has an internal memory for storing programs describing procedures for various processes and data for various processes.

The first communication unit 2c is connected to the administration server 100 by a LAN, for example, to control exchange of information with the administration server 100. For example, the first communication unit 2c transmits to the administration server 100 the communication state monitored by the link monitoring unit 2e. The first communication unit 2c also receives from the administration server 100 the identifier of the computing node or IO node as a transfer destination selected by the administration server 100. The first communication unit 2c outputs to the transfer request unit 2f the received identifier of the computing node or IO node as a transfer destination.

The second communication unit 2d is connected to adjacent computing nodes and adjacent IO nodes by interconnects to control exchange of information with the adjacent computing nodes and the adjacent IO nodes. For example, the second communication unit 2d transmits data to the node as a transfer destination, according to the identifier of the node as a transfer destination received from the administration server 100.

The link monitoring unit 2e monitors the state of communication with adjacent computing nodes and adjacent IO nodes. The link monitoring unit 2e notifies the monitored communication states to the administration server 100 via the first communication unit 2c. The link monitoring unit 2e is one example of a notification unit.

When transferring data to an IO device into or from which data is input or output, the transfer request unit 2f transmits to the administration server 100 a transfer request for requesting the identifier of an information processing device to which the transfer request unit 2f is to transfer the data. For example, when transferring data possessed by the self-device to an IO device into or from which data is input or output, the transfer request unit 2f generates a transfer request and transmits the generated transfer request to the administration server 100 via the first communication unit 2c.

For example, when requesting transfer of data possessed by the self-device to an IO device, the transfer request unit 2f generates a transfer request including data ID, transfer origin ID, final transfer destination ID, and transfer source ID. In the transfer request, the data ID indicates the identifier of data to be transferred, and the transfer source ID indicates the identifier of a computing node as a transfer origin of the data identified by the data ID. The final transfer destination ID indicates the identifier of an IO device as a final transfer destination of the data identified by the data ID, and the transfer source ID indicates the identifier of the self-device. When a computing node as a transfer origin of data generates a transfer request, the transfer request includes the same identifier for transfer origin ID and transfer source ID.

When transferring to an IO device into or from which data is input or output data received from another device, the transfer request unit 2f generates a transfer request and transmits the generated transfer request to the administration server 100 via the first communication unit 2c.

For example, when requesting transfer of data received from another device to the IO device, the transfer request unit 2f generates a transfer request including the data ID, transfer origin ID, final transfer destination ID, and transfer source ID. The data ID, transfer origin ID, and final transfer destination ID included in the transfer request have the same identifiers as those of the data ID, transfer origin ID, and final transfer destination ID included in the received data. Specifically, the data ID, transfer origin ID, and final transfer destination ID included in the transfer request have the same identifiers as those of the data ID, transfer origin ID, and final transfer destination ID included in the transfer request generated by the computing node as a transfer origin of the data. In addition, the transfer source ID has the identifier of the self-device.

The transfer request unit 2f also receives from the administration server 100 via the first communication unit 2c the identifier of the computing node as a transfer destination or the identifier of the IO node as a transfer destination selected by the administration server 100 according to the communication state notified by the link monitoring unit 2e in response to the transfer request transmitted to the administration server 100. Then, the transfer request unit 2f outputs the received identifier of the computing node or IO node as a transfer destination to the transfer unit 2g. The transfer request unit 2f is one example of a transmission unit and a reception unit.

The transfer unit 2g transfers the data to the computing node or IO node with the identifier of the computing node or the IO node as a transfer destination received from the administration server 100. For example, the transfer unit 2g transmits the data to the computing node as a transfer destination or the IO node as a transfer destination via the second communication unit 2d, according to the identifier of the computing node or IO node as a transfer destination received from the transfer request unit 2f via the first communication unit 2c. The data received by the transfer unit 2g includes the data ID, first transfer destination ID, final transfer destination ID, and transfer source ID. In this manner, when the data including the data ID, first transfer destination ID, final transfer destination ID, and transfer source ID is transferred to the computing node as a transfer destination or the IO node as a transfer destination, the node having received the data can determine the final transfer destination.

[Configuration of an IO Node]

Figure 3:
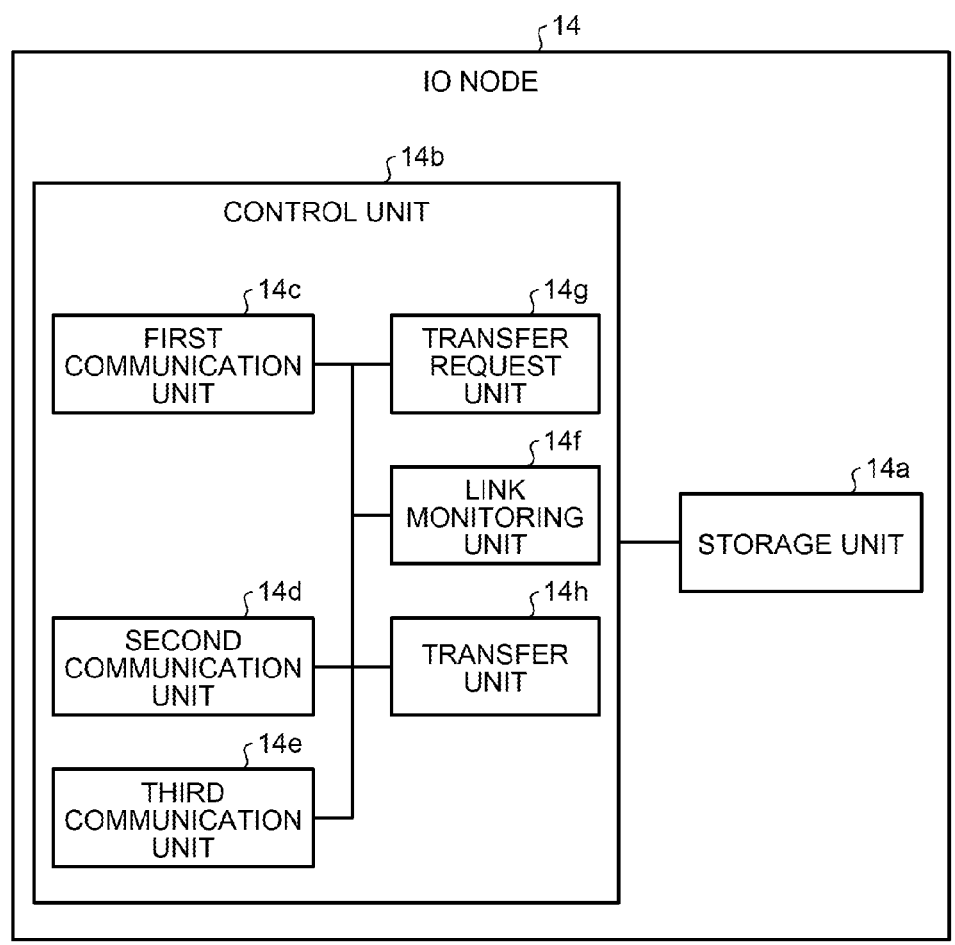
FIG. 3 is a block diagram illustrating a configuration of an IO node.

FIG. 3 is a block diagram illustrating a configuration of an IO node according to the first embodiment. As illustrated in FIG. 3, the IO node 14 includes a storage unit 14a and a control unit 14b. The IO nodes 14 to 17 are the same in configuration, and thus only the configuration of the IO node 14 will be described here and descriptions of the configurations of the IO nodes 15 to 17 will be omitted.

The storage unit 14a is a semiconductor memory element or a storage device such as a hard disk, for example. The storage unit 14a also stores the identifier for identifying the self-device, the identifier for identifying the IO device into or from which data is input or output, and the like.

The control unit 14b includes a first communication unit 14c, a second communication unit 14d, a third communication unit 14e, a link monitoring unit 14f, a transfer request unit 14g, and a transfer unit 14h. For example, the control unit 14b is an integrated circuit such as an ASIC, FPGA, CPU, and MPU, for example. The control unit 14b has an internal memory for storing programs describing procedures for various processes and data for various processes.

The first communication unit 14c is connected to the administration server 100 by a LAN, for example, to control exchange of information with the administration server 100. For example, the first communication unit 14c transmits to the administration server 100 the communication state monitored by the link monitoring unit 14f. The first communication unit 14c also receives from the administration server 100 the identifier of the computing node or IO node as a transfer destination selected by the administration server 100. The first communication unit 14c outputs to the transfer request unit 14g the received identifier of the computing node or IO node as a transfer destination.

The second communication unit 14d is connected to adjacent computing nodes and adjacent IO nodes by interconnects such as Tofu, for example, to control exchange of information with the adjacent computing nodes and the adjacent IO nodes. For example, the second communication unit 14d transmits data to the node as a transfer destination, according to the identifier of the node as a transfer destination received from the administration server 100.

The third communication unit 14e is connected to IO device by fibre channel, for example, to control input or output of data into or from the IO devices. For example, the third communication unit 14e outputs data received from the transfer unit 14h to the IO devices.

The link monitoring unit 14f monitors the state of communication with adjacent computing nodes and adjacent IO nodes. The link monitoring unit 14f notifies the monitored communication states to the administration server 100 via the first communication unit 14c. The link monitoring unit 14f is one example of a notification unit.

When transferring data to an IO device into or from which data is input or output, the transfer request unit 14g transmits to the administration server 100 a transfer request for requesting the identifier of a node as a transfer destination to which the transfer request unit 2f is to transfer the data. Then, the transfer request unit 14g transmits the generated transfer request to the administration server 100 via the first communication unit 14c. The transfer request unit 14g also receives from the administration server 100 via the first communication unit 14c the identifier of the computing node as a transfer destination or the identifier of the IO node as a transfer destination selected by the administration server 100 according to the communications states notified by the link monitoring unit 14f in response to the transmitted transfer request. The transfer request unit 14g is one example of a transmission unit and a reception unit. The transfer request generated by the transfer request unit 14g includes the data ID, first transfer destination ID, final transfer destination ID, and transfer source ID as with the transfer request generated by the transfer request unit 2f of the computing node.

The transfer unit 14h transfers the data to the node as a transfer destination via the second communication unit 14d, according to the identifier of the node as a transfer destination received via the first communication unit 14c. The transfer unit 14h outputs data received from computing nodes and IO nodes to IO devices.

[Configuration of an Administration Server]

Figure 4:
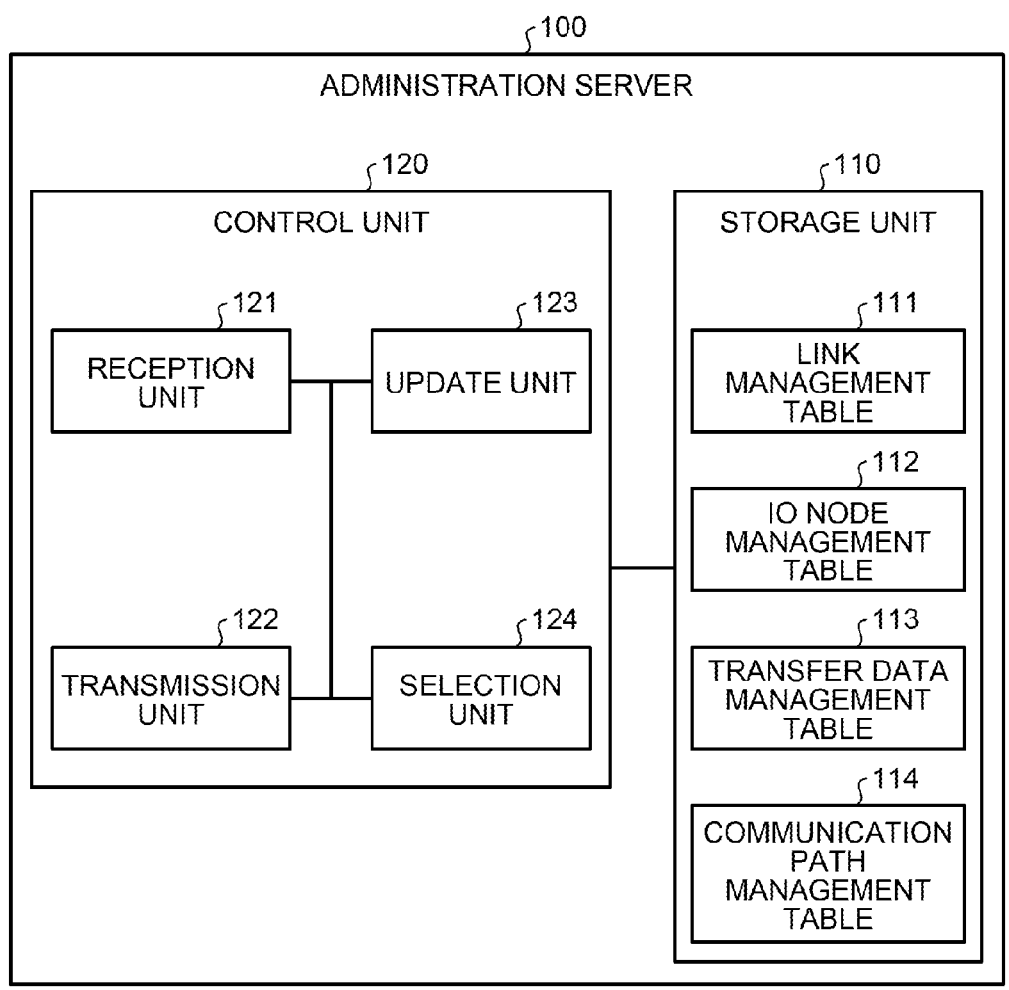
FIG. 4 is a block diagram illustrating a configuration of an administration server.

Next, a configuration of an administration server will be described with reference to FIG. 4. FIG. 4 is a block diagram illustrating a configuration of an administration server according to the first embodiment. As illustrated in FIG. 4, the administration server 100 has a storage unit 110 and a control unit 120.

The storage unit 110 is a semiconductor memory element or a storage device such as an HDD, for example. The storage unit 110 includes a link management table 111, an IO node management table 112, a transfer data management table 113, and a communication path management table 114.

The link management table 111 stores the state of communication between a plurality of nodes. FIG. 5 is a diagram illustrating one example of a link management table. For example, the link management table 111 stores information with associations between "Link ID," "Node a," "Node b," and "Communication state," as illustrated in FIG. 5.

The link management table 111 stores as "Link ID" the identifiers of links connecting adjacent computing nodes, adjacent computing nodes and IO nodes, and adjacent IO nodes. For example, "xxx1," "xxx2," and the like are stored as "Link ID."

Stored as "Node a" are the identifier of one of the computing node and ID node forming a link identified by a link ID. For example, "Computing node 2," "Computing node 3," and the like are stored as "Node a." In addition, stored as "Node b" is the identifier of the other of the computing node and the IO node forming a link identified by a link ID. For example, "Computing node 3," "Computing node 4," and the like are stored as "Node b."

Stored as "Communication state" is information indicative of the state of communications in a link identified by a link identifier. For example, "Normal" indicative of a normal communication state or "Fall" indicative of an abnormal communication state is stored as "Communication state." Of the information stored in the link management table 111, the information stored as "Link ID, Node a, Node b" is set in advance by an administrator. The link management table 111 is one example of a first storage unit.

In the example of FIG. 5, the link management table 111 indicates that the link identified by the link ID "xxx1" connects the computing node 2 and the computing node 3 and the link state is normal. Similarly, the link management table 111 indicates that the link identified by the link ID "xxx2" connects the computing node 3 and the computing node 4 and the link state is normal.

The IO node management table 112 stores the communication state between a plurality of IO devices storing data and the nodes that input or output data into or from the plurality of IO devices. FIG. 6 is a diagram illustrating one example of an IO node management table. For example, the IO node management table 112 stores information with associations between "Link ID," "IO node," "IO device," "Communication state," and "Operation state," as illustrated in FIG. 6.

Stored as "Link ID" in the IO node management table 112 are the identifiers of links connecting IO nodes and IO devices. For example, "001," "002," and the like are stored as "Link ID."

Stored as "IO node" are the identifiers of IO nodes forming links identified by the link IDs. For example, "IO node 14," "IO node 15," and the like are stored as "IO node."

Stored as "IO device" are the identifiers of the IO devices connected by links identified by the link IDs. For example, "IO device 20," "IO device 21," and the like are stored as "IO device."

Stored as "Communication state" is information indicative of the states of communications in links. For example, "Normal" indicative of a normal communication state and "Fall" indicative of an abnormal communication state are stored as "communication state."

Stored as "Operation state" is information indicative of whether the link state is standby or active. For example, "Active" indicative of an active node state and "Standby" indicative of a standby node state are stored as "Operation state."

Specifically, the IO node management table 112 indicates that the link identified by the link ID "001" connects the IO node 14 and the IO device 20, the link state is normal, and the IO node 14 is active. Similarly, the IO node management table 112 indicates that the link identified by the link ID "002" connects the IO node 15 and the IO device 20, the link state is normal, and the IO node 15 is on standby. Of the information stored in the IO node management table 112, information as "Link ID," "IO node," "IO device," and "Operation state" is set in advance by an administrator. The IO node management table 112 is one example of a second storage unit.

Returning to FIG. 4, the transfer data management table 113 stores the identifier of data requested for transfer, the node as a transfer origin of the data, and the node as a final transfer destination of the data, in association with one another. FIG. 7 is a diagram illustrating one example of a transfer data management table. For example, the transfer data management table 113 stores information with associations among "Data ID," "Transfer origin ID," and "Final transfer destination ID," as illustrated in FIG. 7.

In this arrangement, stored as "Data ID" in the transfer data management table 113 are the identifiers of data requested for transfer. For example, "xxx1," "xxx2," and the like are stored as "Data ID." The data ID is given by a computing node as a transfer origin of data.

Stored as "Transfer origin ID" are the identifiers of computing nodes as transfer origins of data identified by the data IDs. For example, "Computing node 2," "Computing node 7," and the like are stored as "Transfer origin ID." The transfer origin ID is given by a computing node as a transfer origin of data.

Stored as "Final transfer destination ID" are the identifiers of IO devices as final transfer destinations of data identified by data IDs. For example, "IO device 20," "IO device 21," and the like are stored as "Final transfer destination ID." The final transfer destination ID is given by a computing node as a transfer origin of data.

In the example of FIG. 7, the transfer data management table 113 indicates that the ID of data to be transferred from the computing node 2 as a transfer origin to the IO device 20 is "xxx1." Similarly, the transfer data management table 113 indicates that the ID of data to be transferred from the computing node 7 as a transfer origin to the IO device 21 is "xxx2."

Returning to FIG. 4, the communication path management table 114 stores communication paths for transferring data requested for transfer to data transfer destinations. FIG. 8 is a diagram illustrating one example of a communication path management table. For example, the communication path management table 114 stores information with associations among "Data ID," "Communication path ID" "Transfer source ID," "Transfer destination ID," "Transfer origin ID," and "Final transfer destination ID," as illustrated in FIG. 8. Information stored as "Data ID," "Transfer origin ID," and "Final transfer destination ID" is the same as that in the transfer data management table 113, and thus descriptions thereof will be omitted.

Stored as "Communication path ID" are the identifiers of transfer segments formed by dividing a communication path for transferring data identified by the data ID to an IO device. For example, stored as "Communication path ID" are "xxx2.01," "xxx2.02," and the like for identifying the divided transfer segments.

Stored as "Transfer source ID" are the identifiers of nodes as transfer sources corresponding to the communication path IDs. For example, "Computing node 7," "Computing node 11," and the like are stored as "Transfer source ID." Stored as "Transfer destination ID" are the identifiers of nodes as transfer destinations corresponding to the communication path IDs. For example, "Computing node 11," "IO node 15," and the like are stored as "Transfer destination ID."

In the example of FIG. 8, the communication path management table 114 indicates that the transfer of data to be transferred from the computing node 7 as a transfer origin to the IO device 21 as a final transfer destination is identified by the data ID "xxx2." The communication path management table 114 also indicates that, for the transfer of the data, there exists a communication path including three divided transfer segments identified by "xxx2.01," "xxx2.02," and "xxx.2.03." The communication path management table 114 indicates that the first transfer segment "xxx2.01" is a path from the computing node 7 as a transfer source to the computing node 11 as a transfer destination. The communication path management table 114 indicates that the second transfer segment "xxx2.02" is a path from the computing node 11 as a transfer source to the IO node 15 as a transfer destination. The communication path management table 114 indicates that the third transfer segment "xxx2.03" is a path from the IO node 15 as a transfer source to the IO device 21 as a transfer destination.

Returning to FIG. 4, the control unit 120 includes a reception unit 121, a transmission unit 122, an update unit 123, and a selection unit 124. For example, the control unit 120 is an integrated circuit such as ASIC, FPGA, CPU, or MPU. The control unit 120 has an internal memory for storing control programs, programs describing procedures for various processes, and data for various processes.

The reception unit 121 receives from each of the computing nodes information indicative of the state of communication in a link connecting the computing node and an adjacent computing node or IO node, and information indicative of the state of communication in a link connecting an IO node and an IO device. Then, the reception unit 121 outputs the received information indicative of the state of communication in link to the update unit 123.

The reception unit 121 receives, from any of a plurality of computing nodes and IO nodes, information indicative of a change made to the state of communications between the subject node and an adjacent computing node or IO node or the state of communication between the node and the subject IO device. Upon receipt of the information on an update to the state of communication between computing nodes or the state of communication between IO nodes, the reception unit 121 outputs the received information to the update unit 123.

The reception unit 121 also receives a transfer request for requesting transfer of data to any of a plurality of IO devices, from any of the computing nodes and IO nodes. For example, the reception unit 121 receives a transfer request for requesting transfer of data from a computing node to an IO node. Then, the reception unit 121 outputs the transfer request for requesting transfer of data from the computing node to the IO device, to the selection unit 124.

The transmission unit 122 receives the identifier of the node as a data transfer destination selected by the selection unit 124, and transmits the received identifier of the node as a data transfer destination to the computing node requesting data transfer to the IO device.

The update unit 123 generates, from the state of communication of in links connecting the computing nodes and the state of communication in links connecting the IO nodes received from the reception unit 121, information with association between the links connecting the nodes and the state of communication in the links.

In the example of FIG. 5, when receiving from the computing node 2 via the reception unit 121 a notification that the state of communication with the computing node 3 is normal, the update unit 123 stores information as indicated in (A) of FIG. 5. Specifically, the update unit 123 stores "Normal" indicative of a normal communication state as "communication state" in the link ID "xxx1."

In the example of FIG. 6, when receiving from the IO node 14 via the reception unit 121 a notification that the state of communication with the IO device 20 is normal, the update unit 123 stores information as indicated in (A) of FIG. 6. Specifically, the update unit 123 stores "Normal" indicative of a normal communication state as "communication state" in link ID "001."

Figure 9:
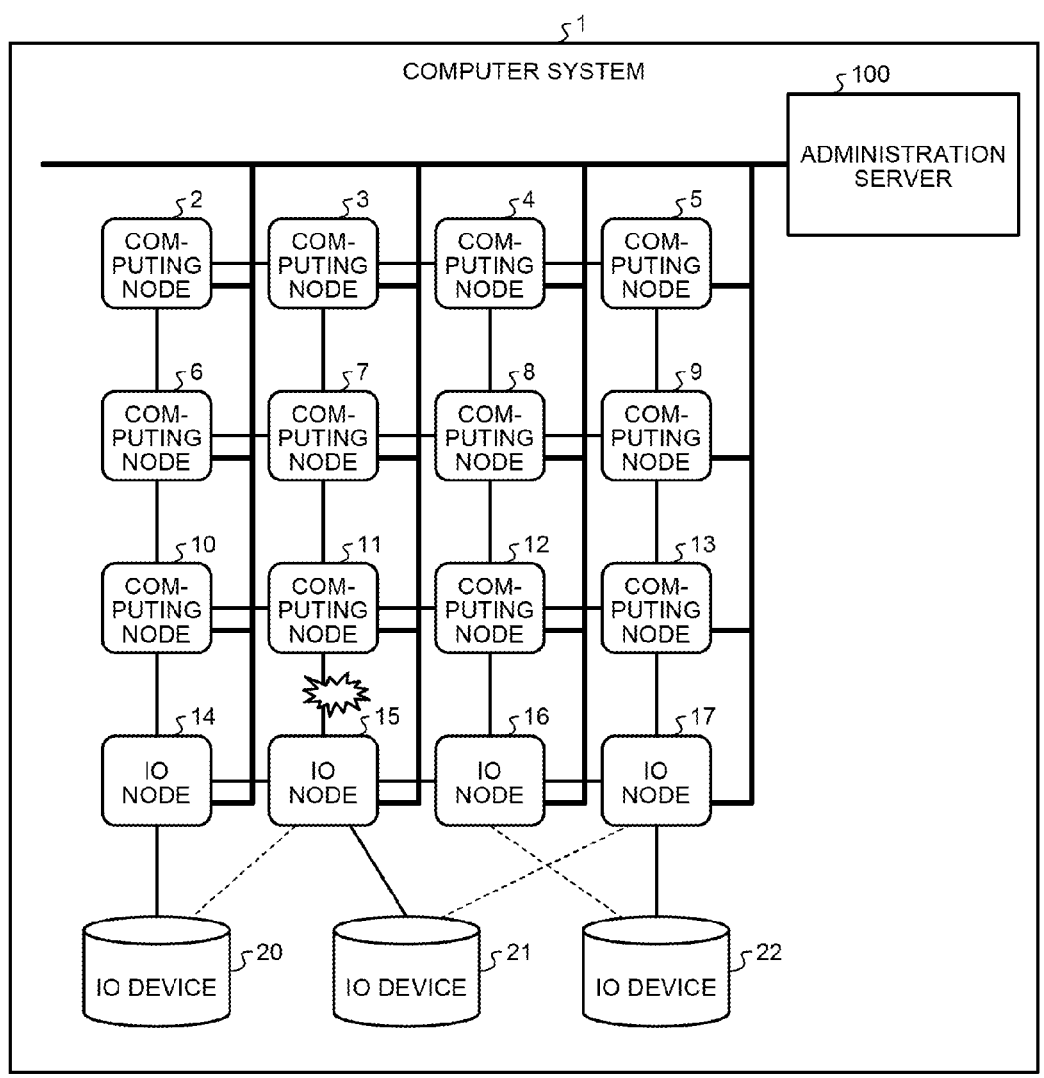
FIG. 9 is a diagram illustrating one example of a computer system in which an abnormality has occurred in communications between a computing node 11 and an IO node 15.

When receiving from the reception unit 121 a notification that an update is performed to the state of communication in a link formed by each of the computing nodes or the state of communication in a link formed by each of the IO nodes, the update unit 123 updates the link management table 111 or the IO node management table 112. A process of updating the link management table 111 by the update unit 123 will be described with reference to FIGS. 9 and 10. FIG. 9 is a diagram illustrating one example of a computer system in which an abnormality has occurred in the state of communication between the computing node 11 and the IO node 15. FIG. 10 is a diagram illustrating one example of a link management table updated by the update unit.

In a case of the computer system illustrated in FIG. 9, the update unit 123 receives from the reception unit 121 a notification that the state of communication in a link formed between the computing node 11 and the IO node 15 is abnormal. In this case, the update unit 123 stores "Fall" indicative of an abnormal communication state as "communication state" corresponding to the link ID=xxx7 in the link management table 111 as illustrated in (A) of FIG. 10.

Figure 11:
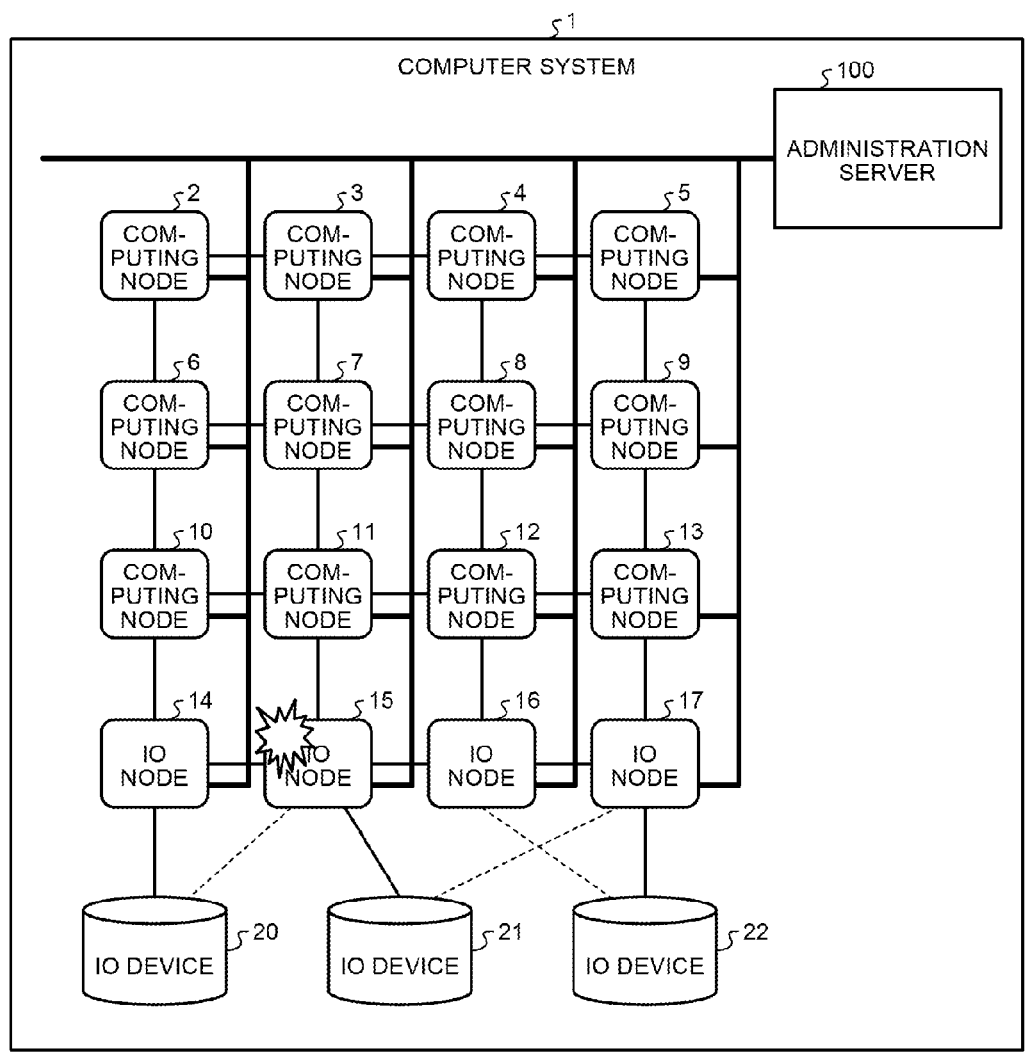
FIG. 11 is a diagram illustrating one example of a computer system in which an abnormality has occurred at an IO node according to a first embodiment.

When receiving from an IO node a notification that an abnormality has occurred at the IO node, the update unit 123 updates the IO node management table 112 and the link management table 111. A process of updating the IO node management table 112 and the link management table 111 by the update unit 123 at occurrence of an abnormality at the IO node will be described with reference to FIGS. 11 and 12. FIG. 11 is a diagram illustrating one example of a computer system at occurrence of an abnormality at an IO node according to the first embodiment. FIG. 12 is a diagram illustrating one example of an IO node management table updated by the generation unit.

As illustrated in FIG. 11, when a failure has occurred at the IO node 15, the update unit 123 executes the following process. Specifically, as illustrated in (A) of FIG. 10, the update unit 123 stores "Fall" indicative of an abnormal communication state as "communication state" and stores "Fall" indicative of an abnormal state as "operation state" corresponding to the "link ID=003" in the IO node management table 112. The update unit 123 also stores "Fall" indicative of an abnormal communication state as "communication state" corresponding to the "link ID=xxx7" in the link management table 111, as illustrated in (A) of FIG. 10.

When receiving a data transfer request, the selection unit 124 selects a communication path through which data can be transferred to an IO device, according to the state of communication in links stored in the link management table 111 and the IO node management table 112. One example of a process performed by the selection unit 124 will be described below in detail. The selection unit 124 is one example of a specifying unit.

For example, upon receipt of a data transfer request, the selection unit 124 determines whether a communication path is already selected. When determining that a communication path is already selected, the selection unit 124 extracts a node as a transfer destination from the communication path management table 114.

Specifically, the selection unit 124 extracts from the data transfer request the data ID, the transfer origin ID for identifying the computing node as a first destination source, the final transfer destination ID for identifying the IO device as a final transfer destination, and the transfer destination ID for identifying the node as a transfer source. Then, the selection unit 124 determines whether there exists a data ID coinciding with the extracted data ID in the transfer data management table 113.

When determining that there exists a data ID coinciding with the extracted data ID in the transfer data management table 113, the selection unit 124 determines that a communication path is already selected. Then, the selection unit 124 searches the communication path management table 114 to extract the transfer destination ID of a record with coincidences in the data ID, the transfer origin ID, the final transfer destination ID, and the transfer source ID. Subsequently, the selection unit 124 outputs the extracted transfer destination ID to the transmission unit 122.

Meanwhile, when determining that there exists no data ID coinciding with the extracted data ID in the transfer data management table 113, the selection unit 124 determines that no communication path is detected. For example, the selection unit 124 determines that no communication path is selected because a transfer request is received from a transfer origin node.

When determining that no communication path is selected, the selection unit 124 then refers to the link management table 111 and the IO node management table 112 to select the shortest communication path in which data can be transferred to the IO device requested by the computing node.

Specifically, when determining that there exists no data ID coinciding with the extracted data ID in the transfer data management table 113, the selection unit 124 determines that no communication path is selected. Then, the selection unit 124 stores the extracted data ID, the transfer origin ID, and the final transfer destination ID, in association with one another in the transfer data management table 113.

The selection unit 124 reads the IO node management table 112 to determine whether there exists an active IO node that inputs or outputs data into or from the IO device as a data transfer destination. When determining that there exists an active IO node that inputs or outputs data into or from the IO device as a data transfer destination, the selection unit 124 selects the active IO node. Then, the selection unit 124 reads the link management table 111 to select one shortest path from the computing node as a first data transfer source to the selected IO node.

The selection unit 124 also determines whether there is any abnormality in links on the selected path. When determining that there is no abnormality, the selection unit 124 generates the selected communication path as the communication path management table 114. Then, the selection unit 124 searches the communication path management table 114 to extract the transfer destination ID of a record with coincidences in the data ID, the transfer origin ID, the final transfer destination ID, and the transfer source ID. The selection unit 124 outputs the extracted transfer destination ID to the transmission unit 122.

When determining that there is an abnormality in any of links on the selected path, the selection unit 124 selects a bypass path bypassing the link determined as being abnormal, and then determines whether the bypass path has been selected. When determining that the bypass path has been selected, the selection unit 124 then determines whether there is an abnormality in any of links on the selected bypass path. In reverse, when determining that no bypass path can be selected, the selection unit 124 notifies the abnormality to the administrator.

Meanwhile, when determining that there exists no active IO node that inputs or outputs data into or from the IO device as a data transfer destination, the selection unit 124 determines whether there exists a standby IO node connected to the IO device as a data transfer destination. When determining that there exists a standby IO node connected to the IO device as a data transfer destination, the selection unit 124 updates the IO node management table 112 to set the standby IO node as IO node that inputs or outputs data into or from the IO device. Then, the selection unit 124 selects the IO node connected to the IO device and selects one shortest path to the selected IO node.

When any failure has occurred at the IO node 15 that inputs or outputs data into or from the IO device 21, as illustrated in FIG. 11, the selection unit 124 executes the following process. Specifically, the selection unit 124 stores "Active" indicative of an active state as "operation state" corresponding to the link ID indicative of the link connecting the IO node 17 and the IO device 21 in the IO node management table 112.

Next, a communication path selection process performed by the selection unit 124 when the computing node 7 requests data transfer to the IO device 21, will be described with reference to the examples of FIGS. 1, 9, and 11. The selection unit 124 selects the IO node 15 as an IO node connected to the IO device 21. When there is no abnormality in the communication path, the selection unit 124 selects the computing nodes 11 and 15 as transfer nodes transferring data from the computing node 7 to the IO device 21, as illustrated in FIG. 1. In this case, the selection unit 124 selects the computing node 11 as a data transfer destination, and outputs the selected data transfer destination to the transmission unit 122. In this case, the selection unit 124 generates the communication path management table 114 illustrated in FIG. 8 according to the identifiers of the selected transfer nodes.

As illustrated in FIG. 9, when the link connecting between the computing node 11 and the IO node 15 is out of order due to any failure or the like, the selection unit 124 executes the following process. Specifically, the selection unit 124 selects a communication path bypassing the link formed between the computing node 11 and the IO node 15.

For example, the selection unit 124 selects the IO node 15 as IO node connected to the IO device 21, and selects the computing node 11, the computing node 12, the IO node 16, and the IO node 15 as transfer nodes transferring data from the computing node 7 to the IO device 21. The selection unit 124 generates the communication path management table 114 as illustrated in FIG. 13A, according to the identifiers of the selected transfer nodes. FIG. 13A is a diagram illustrating one example of a communication path management table. In this case, the selection unit 124 selects the computing node 11 as a data transfer destination, and outputs the selected data transfer destination to the transmission unit 122. However, the communication path selected by the selection unit 124 is not limited to this. For example, the selection unit 124 may select the computing node 11, the computing node 10, the IO node 14, and the IO node 15 as transfer nodes transferring data from the computing node 7 to the IO device 21.

As illustrated in FIG. 11, when any abnormality has occurred at the IO node 15 and the data fails to pass through the link connecting between the IO node 15 and the IO device 21, the selection unit 124 executes the following process. Specifically, the selection unit 124 selects the IO node 17 as IO node connected to the IO device 21. Then, the selection unit 124 selects the computing node 11, the computing node 12, the computing node 13, and the IO node 17 as transfer nodes transferring data from the computing node 7 to the IO device 21, for example. The selection unit 124 generates the communication path management table 114 as illustrated in FIG. 13B according to the identifiers of the selected transfer nodes. FIG. 13B is a diagram illustrating one example of a communication path management table. In this case, the selection unit 124 selects the computing node 11 as a data transfer destination and outputs the selected data transfer destination to the transmission unit 122. The communication path selected by the selection unit 124 is not limited to this. For example, the selection unit 124 may select the computing node 11, the computing node 12, the IO node 16, and the IO node 17 as transfer nodes transferring data from the computing node 7 to the IO device 21.

[Procedure for a Data Transfer Process by a Computing Node]

Next, a procedure for a process of data transfer to an IO device by a computing node according to the first embodiment will be described with reference to FIG. 14. FIG. 14 is a flowchart of a procedure for a process of data transfer to an IO device by a computing node. In the description below, the computing node 2 is used. However, the process described below is not limited to the process by the computing node 2 but the same process is executed by other computing nodes and IO nodes.

When determining that there exists data to be transferred to any of IO devices (Yes in step S101), the computing node 2 transmits the self-device ID, the data ID, the transfer origin ID, and the final transfer destination ID to the administration server 100 (step S102). For example, when the computing node 2 generates by itself data to be transferred to any of the IO devices, or when the computing node 2 receives from an adjacent computing node data to be transferred to any of the IO devices, the computing node 2 determines that there exists data to be transferred to the IO device. When generating by itself the data to be transferred to any of the IO devices, the computing node 2 generates the data ID by itself.

The computing node 2 receives the identifier of the transfer destination node from the administration server 100 (step S103), and transmits the data to the transfer destination node according to the received identifier of the transfer destination node (step S104). For example, the computing node 2 transfers to the transfer destination node data including the data ID, the self-device ID, the transfer origin ID, the final transfer destination ID, and the like. The computing node 2 then terminates the process.

[Procedure for a Process by an Administration Server According to First Embodiment]

Next, procedures for processes performed by the administration server 100 according to the first embodiment will be described with reference to FIGS. 15, 16, and 17. A procedure for a data transfer process by the administration server 100 will be described with reference to FIG. 15, a procedure for a process of updating a link management table and an IO node management table by the administration server 100 will be described with reference to FIG. 16, and a procedure for a path selection process by the administration server 100 will be described with reference to FIG. 17.

(Procedure for a Data Transfer Process)

FIG. 15 is a flowchart of a data transfer process by the administration server according to the first embodiment. For example, the administration server 100 executes the process upon receipt of a request for data transfer from any of the computing nodes to an IO device.

As illustrated in FIG. 15, the reception unit 121 of the administration server 100 receives from a computing node a request for data transfer to an IO device (step S201). Then, the selection unit 124 extracts a data ID (step S202) and determines whether a path associated with the extracted data ID is already selected (step S203). Here, the selection unit 124 determines whether there exists a data ID coinciding with the extracted data ID in the transfer data management table 113. When determining that there exists a data ID coinciding with the extracted data ID in the transfer data management table 113, the selection unit 124 determines that a communication path is already selected. In reverse, when determining that there exists no data ID coinciding with the extracted data ID in the transfer data management table 113, the selection unit 124 then determines that no communication path is selected.

When determining that no path is selected (No in step S203), the selection unit 124 executes a process of selecting a communication path (step S204). When it is determined by the selection unit 124 that a path is already selected (Yes in step S203) or a communication path is selected in the process at step S204 executed by the selection unit 124, the transmission unit 122 identifies the node as a transfer destination from the selected path, and notifies the transfer destination to the computing node (step S205). The selection unit 124 then terminates the process.

(Procedure for a Process of Updating a Link Management Table and an IO Node Management Table)

Figure 16:
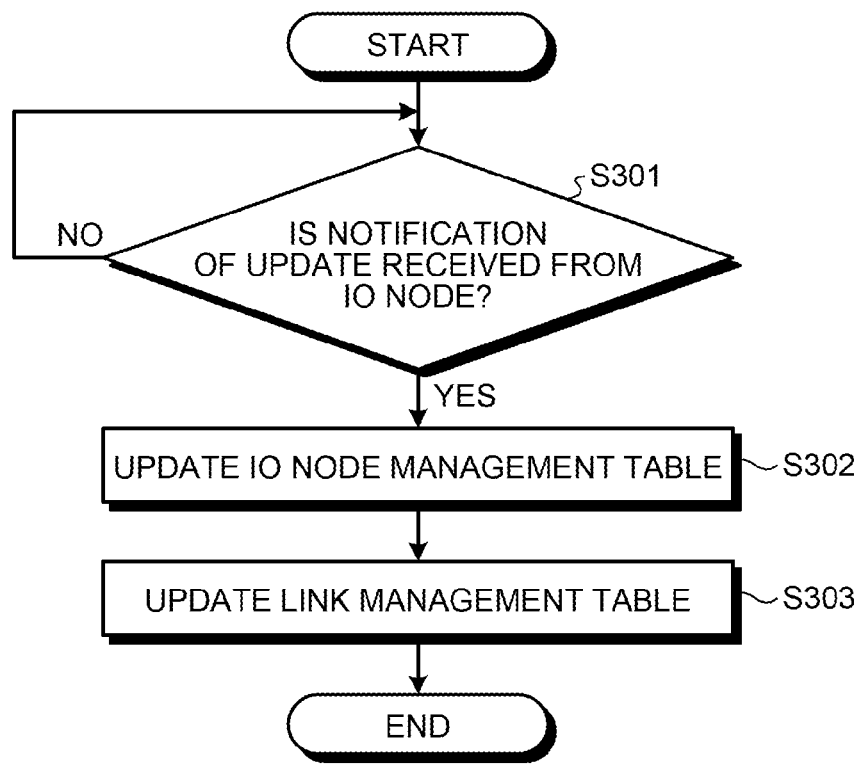
FIG. 16 is a flowchart of a procedure for an updating process.

FIG. 16 is a flowchart of a procedure for a process of updating a link management table and an IO node management table. The administration server 100 executes the process upon receipt of a notification that an abnormality has occurred at an IO node from the abnormal IO node.

As illustrated in FIG. 16, when receiving a notification of an update from an IO node (Yes in step S301), the administration server 100 updates "communication state" in the IO node management table 112 (step S302). For example, when being notified by the IO node 15 that an abnormality has occurred at the IO node 15, the administration server 100 stores "Fall" indicative of an abnormality as "communication state" in the IO node management table 112. When being notified by the IO node 15 having recovered from the abnormality that the IO node 15 is normal, the administration server 100 stores "Normal" indicative of a normality as "communication state" in the IO node management table 112, and stores "Standby" as "operation state."

The administration server 100 also updates the state of communication with an abnormal IO node in the link management table 111 (step S303). For example, when being notified by the IO node 15 that an abnormality has occurred at the IO node 15, the administration server 100 stores "Fall" indicative of an abnormality as "communication state" in the link formed with the IO node 15 in the link management table 111. When being notified by the IO node 15 having recovered from the abnormality that the IO node 15 is normal, the administration server 100 stores "Normal" indicative of a normality as "communication state" in a link formed with the IO node 15 in the link management table 111.

(Procedure for a Path Selection Process)

Figure 17:
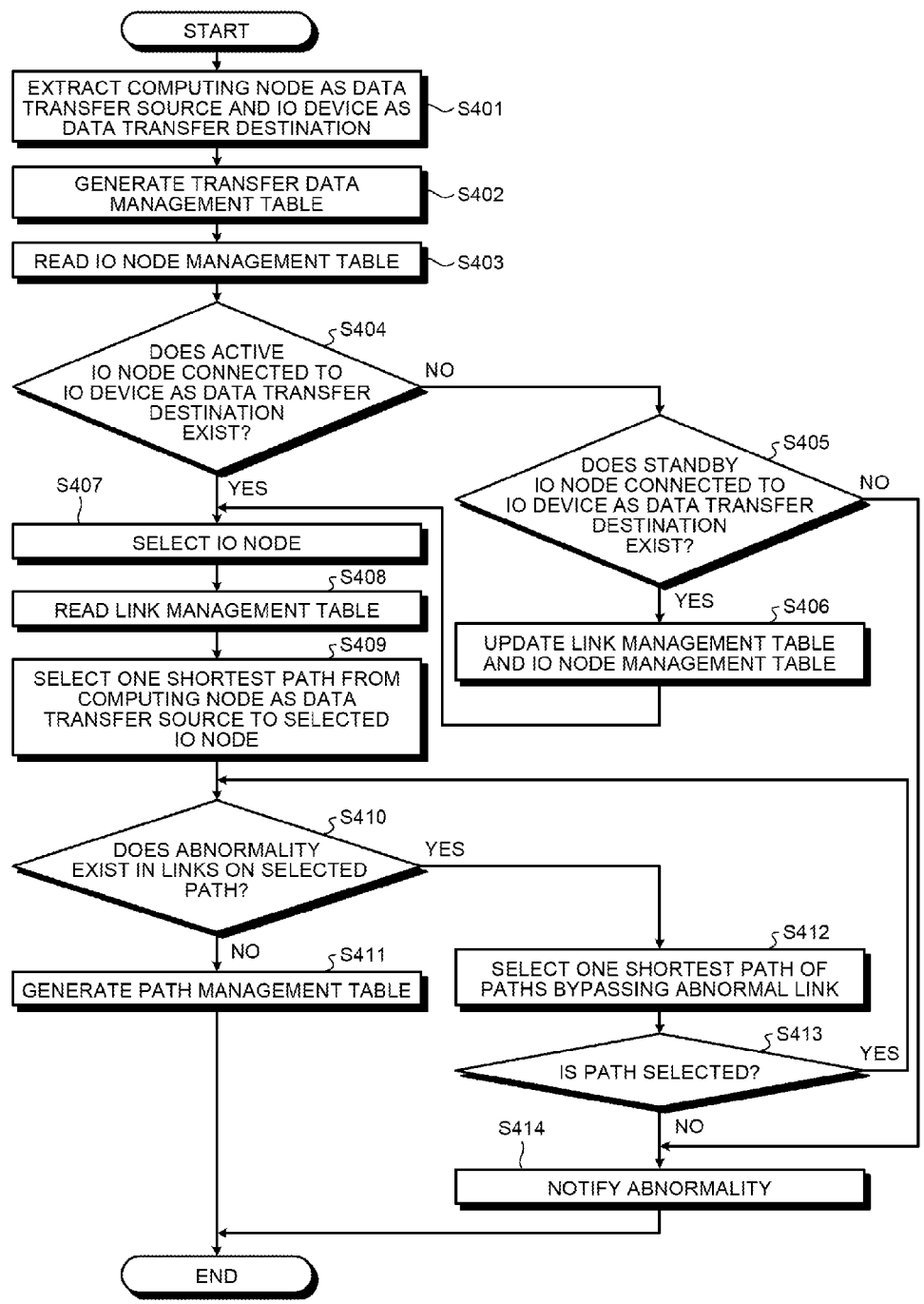
FIG. 17 is a flowchart of a procedure for a path selection process.

FIG. 17 is a flowchart of a path selection process. This process corresponds to the process at step S204 in FIG. 15, and the administration server 100 executes the process when the selection unit 124 determines that no path associated with the extracted data ID is selected.

As illustrated in FIG. 17, the selection unit 124 of the administration server 100 extracts a computing node as a data transfer source and an IO device as a data transfer destination (step S401), and generates the transfer data management table 113 (step S402).

The selection unit 124 reads the IO node management table 112 (step S403), and determines whether there exists any active IO node connected to the IO device as a data transfer destination (step S404). When determining that there exists no active IO node connected to the IO device as a data transfer destination (No in step S404), the selection unit 124 executes the following process. Specifically, the selection unit 124 determines whether there exists any standby IO node connected to the IO device as a data transfer destination (step S405).

When it is determined by the selection unit 124 that there exists a standby IO node connected to the IO device as a data transfer destination (Yes in step S405), the update unit 123 updates the IO node management table 112 and the link management table 111 (step S406).

When the selection unit 124 determines that there exists an active IO node connected to the IO device as a data transfer destination (Yes in step S404) and when the IO node management table 112 and the link management table 111 are updated at step S406, the selection unit 124 executes the following process. Specifically, the selection unit 124 selects the IO node (step S407), and then reads the link management table 111 (step S408).

Next, the selection unit 124 selects one shortest path from the computing node as a data transfer source to the selected IO node (step S409), and determines whether there is any abnormality in the links or nodes on the selected path (step S410). When determining that there is no abnormality in the links or nodes on the selected path (No in step S410), the selection unit 124 generates the communication path management table 114 (step S411) and then terminates the process.

Meanwhile, when determining that there is any abnormality in the links or nodes on the selected path (Yes in step S410), the selection unit 124 selects one shortest path out of paths bypassing the abnormal link or node (step S412). When determining that the shortest path has been selected (Yes in step S413), the selection unit 124 proceeds to step S410 to determine whether there is any abnormality in the links or nodes on the selected shortest path.

Meanwhile, when determining that no shortest path can be selected (No in step S413), the selection unit 124 notifies the abnormality (step S414) and terminates the process. When determining that there exists no standby IO node connected to the IO device as a data transfer destination (No in step S405), the selection unit 124 notifies the abnormality (step S414) and terminates the process.

[Advantages of First Embodiment]

As described above, in the first embodiment, the selection unit 124 of the administration server 100 notifies the identifier of the node as a transfer destination specified from the generated communication path management table 114, to the node as a transfer origin. Accordingly, even if an abnormality has occurred at a link or node in the computer system 1, the computing node as a data transfer source can transfer data to the IO device as a transfer destination. In the computer system 1, for example, at occurrence of any trouble at a link or node on a communication path, availability improvement data to be transferred for improvement of availability of a system can be transferred to the IO device.

In the foregoing description, the administration server 100 is configured to specify a node as a transfer destination from the generated communication path management table 114 and transmit the identifier of the specified transfer destination node to the node as a transfer origin. However, the administration server 100 is not limited to this. For example, the administration server 100 may be configured to generate the communication path management table 114 and transmit the same to all computing nodes and IO nodes on a communication path.

[Second Embodiment]

In the first embodiment described above, the entire data to be input or output is transferred at once. However, when data to be written can be separated into a plurality of pieces at an IO node as a transfer destination, it is not necessarily needed to transfer the entire data at once. In addition, if there exists a data chunk management mechanism that divides data into plurality of pieces, time slots may be allocated to communication of the individual data chunks. Accordingly, as a second embodiment, an example of an administration server will be described. The administration server includes a data chunk management mechanism that divides data and a time slot management mechanism that divides right to use each link by time slot according to a specific time interval or a unit of transfer and manages these time slots as resources.

[Configuration of an Administration Server According to Second Embodiment]

Figure 18:
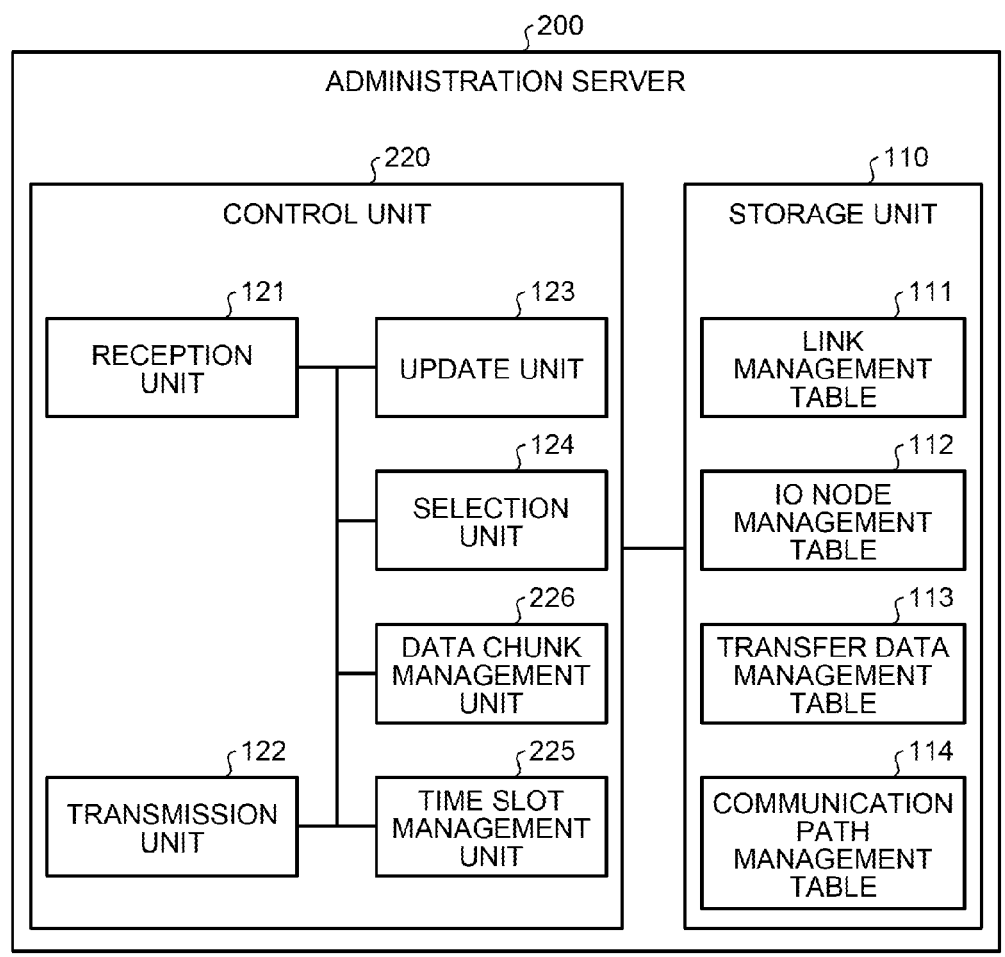
FIG. 18 is a block diagram illustrating a configuration of an administration server according to a second embodiment.

FIG. 18 is a block diagram illustrating a configuration of an administration server according to the second embodiment. As illustrated in FIG. 18, an administration server 200 includes the storage unit 110 and a control unit 220. Functional units performing the same roles as those of the units illustrated in FIG. 4 are given the same reference numerals as those in FIG. 4 and thus detailed descriptions thereof are omitted.

The control unit 220 includes the reception unit 121, the transmission unit 122, the update unit 123, the selection unit 124, a time slot management unit 225, and a data chunk management unit 226.

The time slot management unit 225 manages the right to use each link divided by time slot according to a specific time interval or a unit of transfer as a communication resource. For example, when the sum of available bands of links is small with respect to the data amount, the time slot management unit 225 accepts requests for right to use links on paths from the computing nodes to the IO devices, and allocates the right to use the links. The time slot management unit 225 outputs information on the right to use the links to the transmission unit 122. As a result, the transmission unit 122 transmits the allocated right to use the links to the computing nodes having requested for the right to use the links.

The data chunk management unit 226 associates data chunks as units of transfer divided in a predetermined size with the data before the division, and manages transfer destinations of the data chunks. For example, the data chunk management unit 226 can manage the time-divided time slots to use effectively the communication bands for communication performed by the self-device and communication performed by other nodes.

As described above, when the administration server 200 divides the data and divides the right to use the links by time slot according to a specific time interval or a unit of transfer, the computing nodes can prevent a reduction in effective communication bands due to congestion occurring in the case where data transfer is started beyond the communication band. For example, the administration server 200 is effective in transferring availability data including a large amount of data to be transferred in a short time.

[Third Embodiment]

The present invention can be carried out in various modes other than the foregoing examples. Thus, another example of the present invention will be described as a third embodiment.

(System Configuration and Others)

Of the processes described above in relation to the first embodiment and the second embodiment, all or some of processes to be automatically performed may be manually carried out. Alternatively, all or some of processes manually performed may be automatically carried out. Besides, the process steps, control steps, and specific designations illustrated above in the text or drawings may be arbitrarily changed unless otherwise specified.

The information stored in the storage unit illustrated in the drawings is a mere example, and the information is not necessarily stored in the manner as illustrated.

In the foregoing description, the selection unit 124 is configured to determine whether there exists a data ID coinciding with the extracted data ID in the transfer data management table 113, thereby to determine whether a path associated with the extracted data ID is already selected, but the selection unit 124 is not limited to this. For example, the selection unit 124 may determine whether a path is already selected by extracting the transfer origin ID and the transfer destination ID included in a transfer request and determining whether the transfer origin ID and the transfer destination ID coincide with each other. When determining that the transfer origin ID and the transfer source ID coincide with each other, the selection unit 124 determines that no path is selected. Meanwhile, when determining that the transfer origin ID and the transfer source ID do not coincide with each other, the selection unit 124 determines that a path is already selected. That is, upon receipt of a transfer request from a transfer origin, the selection unit 124 determines that no path is selected, and upon receipt of a transfer request from a node not a transfer origin, the selection unit 124 determines that a path is already selected.

In the foregoing description, the links between adjacent computing nodes, between adjacent computing nodes and IO nodes, and adjacent IO nodes are physical links, but the links are not limited to this. For example, the links between adjacent computing nodes, between adjacent computing nodes and IO nodes, and adjacent IO nodes may be a virtual channel.

The sequence of steps in the processes described above in relation to the foregoing examples may be changed according to various loads, usage situations, or the like. For example, step S302 and step S303 described in FIG. 16 may be carried out at the same time.

The illustrated components are functional concepts and thus are not necessarily configured in a physical form unlike in the drawings. For example, the update unit 123 and the selection unit 124 in the administration server 100 may be integrated. Further, all or arbitrary ones of the processes performed at the devices may be realized by a CPU and programs analyzed and executed by the CPU or may be realized as hardware by a wired logic.

(Programs)

The various processes described above in relation to the foregoing examples may be realized by executing prepared programs in a computer system such as a personal computer or a workstation. Thus, one example of a computer executing programs having the same functions as those in the foregoing examples will be described below.

Figure 19:
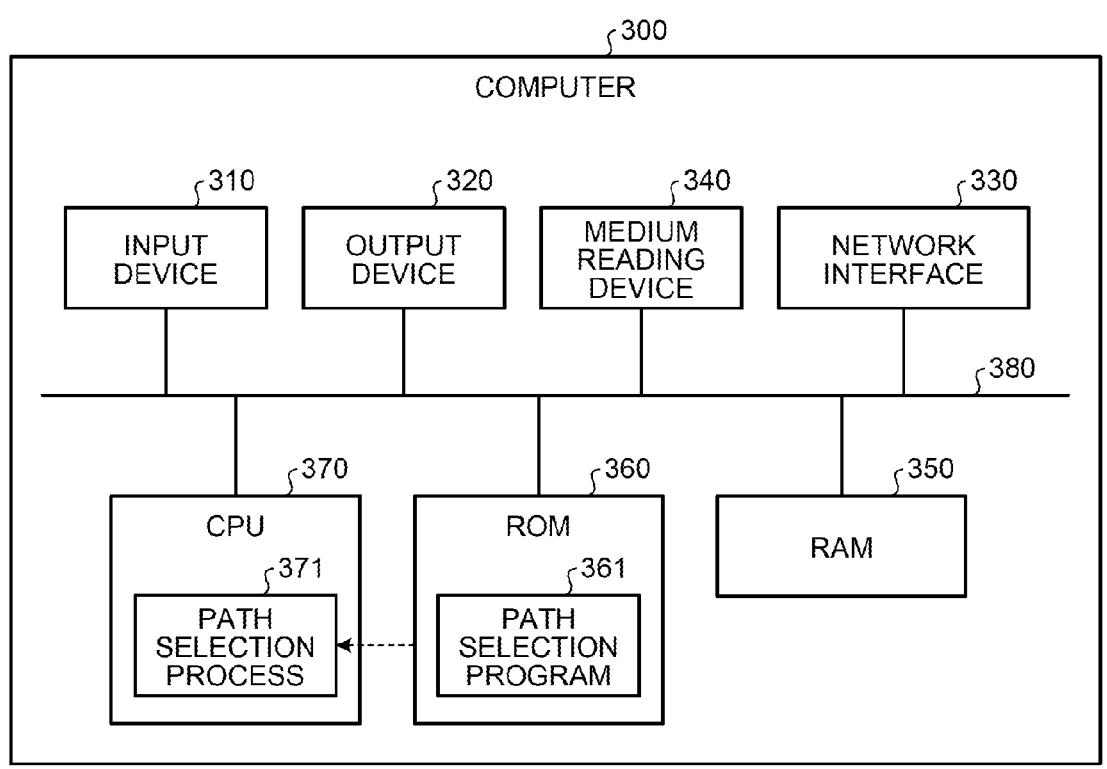
FIG. 19 is a diagram illustrating one example of a computer executing a path selection program.

FIG. 19 is a diagram illustrating one example of a computer executing a path selection program. As illustrated in FIG. 19, a computer 300 has an input device 310 that accepts data, various settings, and the like from a user, and an output device 320 that notifies computer status and the like. The computer 300 also has a network interface 330 exchanging data with other devices, a medium reading device 340, a RAM (random access memory) 350, a ROM (read only memory) 360, a CPU 370, and a bus 380. The devices 310 to 370 are each connected to the bus 380.

As illustrated in FIG. 19, the ROM 360 stores in advance a path selection program 361 having the same functions as those of the reception unit 121, the transmission unit 122, the update unit 123, and the selection unit 124 illustrated in FIG. 4. The CPU 370 reads the path selection program 361 from the ROM 360 and executes the same as a path selection process 371. That is, the path selection process 371 implements the same operations as those of the reception unit 121, the transmission unit 122, the update unit 123, and the selection unit 124 illustrated in FIG. 4.

Figure 20:
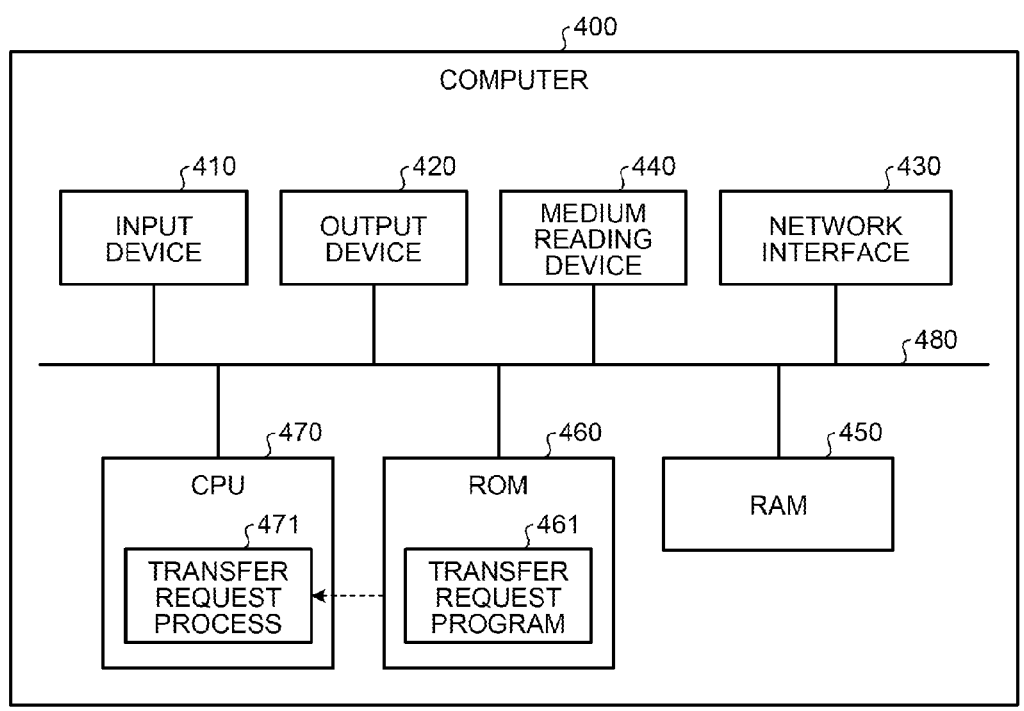
FIG. 20 is a diagram illustrating one example of a computer executing a transfer request program.
Figure 21:
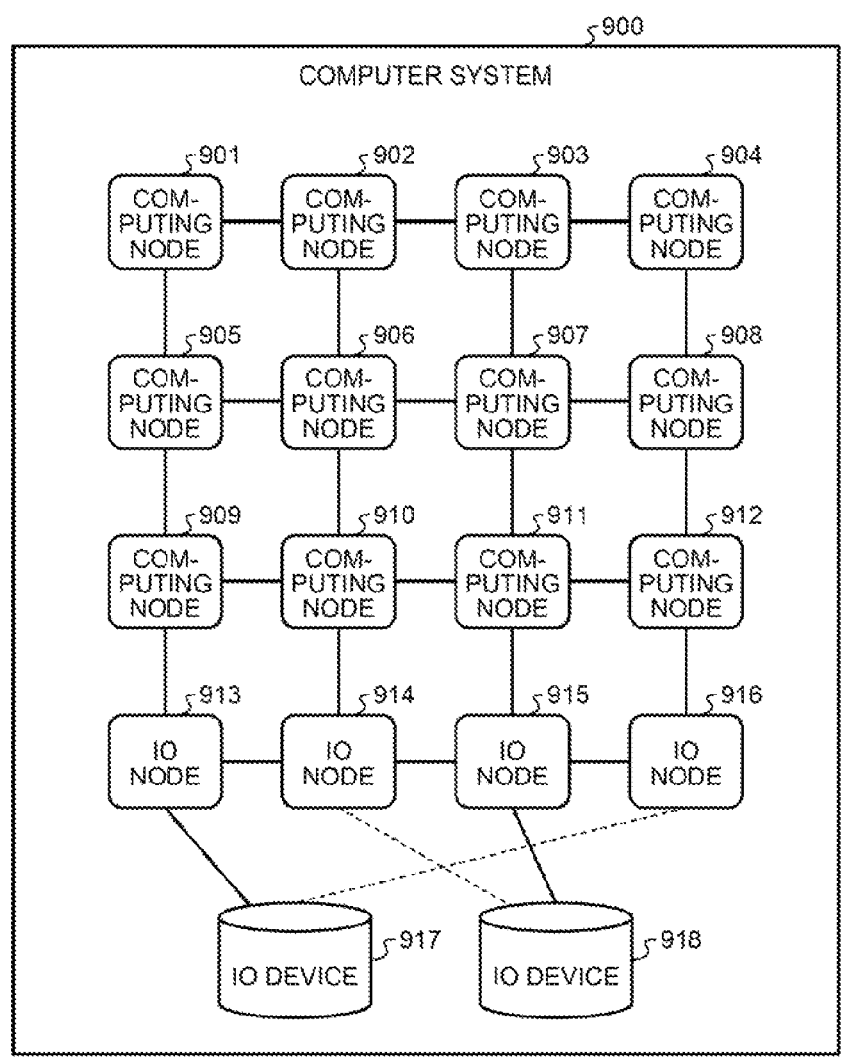
FIG. 21 is a diagram illustrating a configuration example of a computer system having a cluster configuration.

FIG. 20 is a diagram illustrating one example of a computer executing a transfer request program. As illustrated in FIG. 20, a computer 400 has an input device 410 that accepts data, various settings, and the like from a user, and an output device 420 that notifies computer status and the like. The computer 400 also has a network interface 430 exchanging data with other devices, a medium reading device 440, a RAM 450, a ROM 460, a CPU 470, and a bus 480. The devices 410 to 470 are each connected to the bus 480.

As illustrated in FIG. 20, the ROM 460 stores in advance a transfer request program 461 having the same functions as those of the link monitoring unit 2e, the transfer request unit 2f, and the transfer unit 2g illustrated in FIG. 2. The CPU 470 reads the transfer request program 461 from the ROM 460, and executes the same as a transfer request process 471. That is, the transfer request process 471 implements the same actions as those of the link monitoring unit 2e, the transfer request unit 2f, and the transfer unit 2g illustrated in FIG. 2.

The path selection program 361 and the transfer request program 461 are not necessarily stored in the ROM. For example, the path selection program 361 and the transfer request program 461 may be stored in a portable physical medium such as a flexible disk (FD), CD-ROM, MO disc, DVD disc, magnetic optical disc, or IC card inserted into the computers 300 and 400. Alternatively, the path selection program 361 and the transfer request program 461 may be stored in a fixed physical medium such as a hard disc drive (HDD) provided inside or outside the computers 300 and 400. Alternatively, the path selection program 361 and the transfer request program 461 may be stored in another computer system connected to the computers 300 and 400 via a public line, the Internet, a LAN (local area network), a WAN (wide area network), or the like. The computers 300 and 400 may read the programs from the other computer system and execute the same.

That is, the programs are stored in a computer-readable manner in a storage medium such as a portable physical medium, fixed physical medium, communication medium, or the like, as described above. The computers 300 and 400 read the programs from such a recording medium and execute the same to realize the same functions as those of the foregoing examples. The programs in the other examples are not limited to the programs to be executed by the computers 300 and 400. For example, the present invention can also be applied to the case where any other computer system or server executes the programs or the case where the computer system and the server execute the programs in cooperation.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

[Advantageous Effects of Invention]

The present invention realizes improvement in availability of data transfer.

What is claimed is:

1. An administration device, comprising:
  a first storage unit that stores first communication state between a plurality of interconnected information processing devices or between one of the plurality of interconnected information processing devices and an input-output device;
  a second storage unit that stores second communication state between the input-output device into or from which data is input or output and an input-output processing device that inputs or outputs data into or from the input-output device;
  a reception unit that receives a transfer request for requesting data transfer to the input-output device from one of the plurality of information processing devices;
  a specifying unit that, in response to the transfer request received by the reception unit, determines whether a communication path to the input-output device is already selected, when determining that the communication path to the input-output device is already selected, specifies one of the plurality of information processing devices or an input-output processing device as a transfer destination from the selected communication path, and when determining that the communication path is not selected, selects a communication path to the input-output device according to the first communication state stored in the first storage unit and the second communication state stored in the second storage unit, and specifies one of the plurality of information processing devices or an input-output processing device as a transfer destination according to the selected communication path; and
  a transmission unit that transmits, to the information processing device having issued the transfer request, an identifier for identifying the information processing device or the input-output device specified by the specifying unit.

2. The administration device according to claim 1, wherein, when an abnormality has occurred in an input-output processing device that inputs or outputs data into or from the input-output device as a requested transfer destination or in connection between the input-output device and the input-output processing device, the specifying unit determines whether there exists another input-output processing device that inputs or outputs data into or from the input-output device as a requested transfer destination, and when determining that there exists the other input-output processing device, the specifying unit updates the identification information of the input-output processing device stored in the second storage unit in association with the input-output device to change into identification information of the other input-output processing device and selects a communication path to the input-output device, and specifies one of the information processing devices or an input-output processing device as a data transfer destination according to the selected communication path.

3. The administration device according to claim 1, further comprising:
an update unit that, when receiving from any of the plurality of information processing devices information indicating state of communication between the information processing device and another information processing device adjacent to the information processing device, or between the information processing device and an input-output processing device adjacent to the information processing device or state of communication between the information processing device and an input-output device is changed, updates the first communication state stored in the first storage unit or the second communication state stored in the second storage unit.

4. The administration device according to claim 1, wherein, when the reception unit receives a transfer request, the specifying unit selects a shortest communication path out of communication paths to the input-output device as a requested transfer destination, according to the first and second communication states stored in the first storage unit and the second storage unit, and specifies one of the plurality of information processing devices or an input-output processing device as a data transfer destination according to the selected shortest communication path.

5. An information processing device connected to a plurality of information processing devices and an administration device, comprising:
a notification unit that monitors state of communication with the plurality of information processing devices and notifies the monitored state of communication to the administration device;
a transmission unit that, when data is to be transferred to an input-output device into or from which data is input or output, transmits to the administration device a transfer request for requesting identifier of one of the plurality of information processing devices to which the self-device is to transfer the data;
a reception unit that, in response to the transfer request transmitted by the transmission unit, receives from the administration device the identifier of the information processing device as a transfer destination selected by the administration device according to the state of communication notified by the notification unit; and
a transfer unit that transfers the data to the information processing device identified by the identifier received from the administration device.

6. The information processing device according to claim 5, wherein the transmission unit transmits to the administration device a transfer request including an identifier of data to be transferred, an identifier of the self-device, and an identifier of the input-output device.

7. A data transfer method in an information processing system comprising a plurality of information processing devices connected in a mesh form or a torus form, an input-output device into or from which data is input or output by the plurality of information processing devices, and an administration device connected to each of the plurality of information processing devices, the data transfer method comprising:
when data is to be transferred to the input-output device, transmitting, by the information processing device, to the administration device a transfer request for requesting identifier of the information processing device to which the self-device is to transfer the data,
receiving, by the administration device, a transfer request for requesting data transfer to the input-output device from an information processing device,
in response to the received transfer request, determining, by the administration device, whether a communication path to the input-output device is already selected,
when it is determined that the communication path to the input-output device is already selected, specifying, by the administration device, an information processing device or an input-output processing device as a transfer destination from the selected communication path,
when it is determined that the communication path is not selected, selecting, by the administration device, a communication path to the input-output device according to states of communication between interconnected information processing devices or interconnected information processing device and input-output device and states of communication between the input-output device and an input-output processing device that inputs or outputs data into or from the input-output device,
specifying, by the administration device, an information processing device or an input-output processing device as a transfer destination according to the selected communication path,
transmitting, by the administration device, to the information processing device having issued the transfer request, an identifier for identifying the specified information processing device or input-output device,
in response to the transmitted transfer request, receiving, by the information processing device, from the administration device the identifier of the information processing device as a transfer destination selected by the administration device, and
transferring, by the information processing device, the data to an information processing device with the identifier of the information processing device as a transfer destination received from the administration device.

* * * * *